(12) United States Patent
Samson et al.

(10) Patent No.: US 12,196,156 B2
(45) Date of Patent: Jan. 14, 2025

(54) SYMMETRIC CASCADE THRUST REVERSERS AND RELATED METHODS

(71) Applicant: The Boeing Company, Chicago, IL (US)

(72) Inventors: Eric S. Samson, Seattle, WA (US); Garrett D. Klovdahl, North Bend, WA (US)

(73) Assignee: The Boeing Company, Arlington, VA (US)

( * ) Notice: Subject to any disclaimer, the term of this patent is extended or adjusted under 35 U.S.C. 154(b) by 7 days.

(21) Appl. No.: 17/444,116

(22) Filed: Jul. 30, 2021

(65) Prior Publication Data
US 2023/0032868 A1    Feb. 2, 2023

(51) Int. Cl.
*F02K 1/72*    (2006.01)

(52) U.S. Cl.
CPC .......... *F02K 1/72* (2013.01); *F05D 2240/129* (2013.01)

(58) Field of Classification Search
CPC ......... F02K 1/72; F02K 1/70; F05D 2240/129
See application file for complete search history.

(56) References Cited

U.S. PATENT DOCUMENTS

| | | | | |
|---|---|---|---|---|
| 4,731,991 A | * | 3/1988 | Newton | F02K 1/72 239/265.31 |
| 2016/0146156 A1 | * | 5/2016 | Crawford | F02K 1/72 239/265.27 |
| 2016/0273487 A1 | * | 9/2016 | Vauchel | F01D 25/24 |
| 2018/0252336 A1 | * | 9/2018 | Erkelens | B64C 1/406 |
| 2018/0340492 A1 | * | 11/2018 | Harpal | F02K 1/72 |
| 2020/0189725 A1 | * | 6/2020 | Jasklowski | F02K 1/66 |
| 2020/0200124 A1 | * | 6/2020 | Chilukuri | F02K 1/766 |

\* cited by examiner

*Primary Examiner* — Andrew H Nguyen
(74) *Attorney, Agent, or Firm* — Hanley, Flight & Zimmerman, LLC

(57) ABSTRACT

Symmetric cascade thrust reversers and related methods are disclosed. An example apparatus includes a first cascade and a second cascade, the first cascade and the second cascade to be radially spaced relative to a longitudinal axis of a first aircraft engine extending in a fore-aft direction, the first cascade to provide a first flow characteristic and the second cascade to provide a second flow characteristic, the first flow characteristic provided by the first cascade symmetric relative to the second flow characteristic of the second cascade with respect to a vertical plane passing through the longitudinal axis of the aircraft engine.

20 Claims, 11 Drawing Sheets

SYMMETRIC CASCADE THRUST REVERSERS AND RELATED METHODS

FIELD OF THE DISCLOSURE

This disclosure relates generally to aircraft engines and, more particularly, to symmetric cascade thrust reverser and related methods.

BACKGROUND

Aircraft turbofan engines often employ thrust reverser systems to produce a reverse thrust to help decelerate the aircraft upon landing (e.g., after touchdown), thereby enabling shorter landing distances and providing a redundant method of slowing the aircraft. For example, thrust reverser systems may be deployed upon landing to provide additional stopping forces in adverse weather conditions (e.g., on wet, slushy, or slippery runways). To produce reverse thrust and/or reduce forward thrust, many known thrust reverser systems of turbofan engines include a cascade assembly to redirect or to vector airflow (e.g., provided by a fan of the turbofan engine) that would otherwise produce a forward thrust.

SUMMARY

An example apparatus includes a first cascade and a second cascade. The first cascade and the second cascade are radially spaced relative to a longitudinal axis of a first aircraft engine extending in a fore-aft direction. The first cascade is to provide a first flow characteristic and the second cascade is to provide a second flow characteristic. The first flow characteristic provided by the first cascade is symmetric relative to the second flow characteristic of the second cascade with respect to a vertical plane passing through the longitudinal axis of the aircraft engine.

Another example apparatus includes a first aircraft engine including a first thrust reverser system. The first thrust reverser system includes a plurality of first cascades radially spaced relative to a first longitudinal axis of the first aircraft engine. A respective one of the first cascades is configured to provide a corresponding one of first exhaust vectors when the first thrust reverser system is in a deployed position. Also, each one of the first cascades is in a unique radial position relative to the first longitudinal axis. A plurality of second cascades are radially spaced relative to the first longitudinal axis of the first aircraft engine. A respective one of the second cascades is configured to provide a corresponding one of second exhaust vectors when the first thrust reverser system is in the deployed position. Each one of the second cascades is in a unique radial position relative to the first longitudinal axis. Respective ones of the first exhaust vectors are symmetric relative to the respective ones of the second exhaust vectors with reference to a first vertical plane passing through the first longitudinal axis of the first aircraft engine and extending in a fore-aft direction of the first aircraft engine.

An example method includes obtaining a plurality of first cascades, a respective one of the first cascades to generate a corresponding one of first exhaust vectors. The method includes obtaining a plurality of second cascades, a respective one of the second cascades to generate a corresponding one of second exhaust vectors. The method includes radially spacing the first cascades and the second cascades about a first center axis extending in a fore-aft direction of a first aircraft engine and orienting respective ones of the first cascades and corresponding first exhaust vectors and respective ones of the second cascades and corresponding second exhaust vectors symmetrically about a first vertical plane passing through a first center line of the first aircraft engine.

Figure 1:
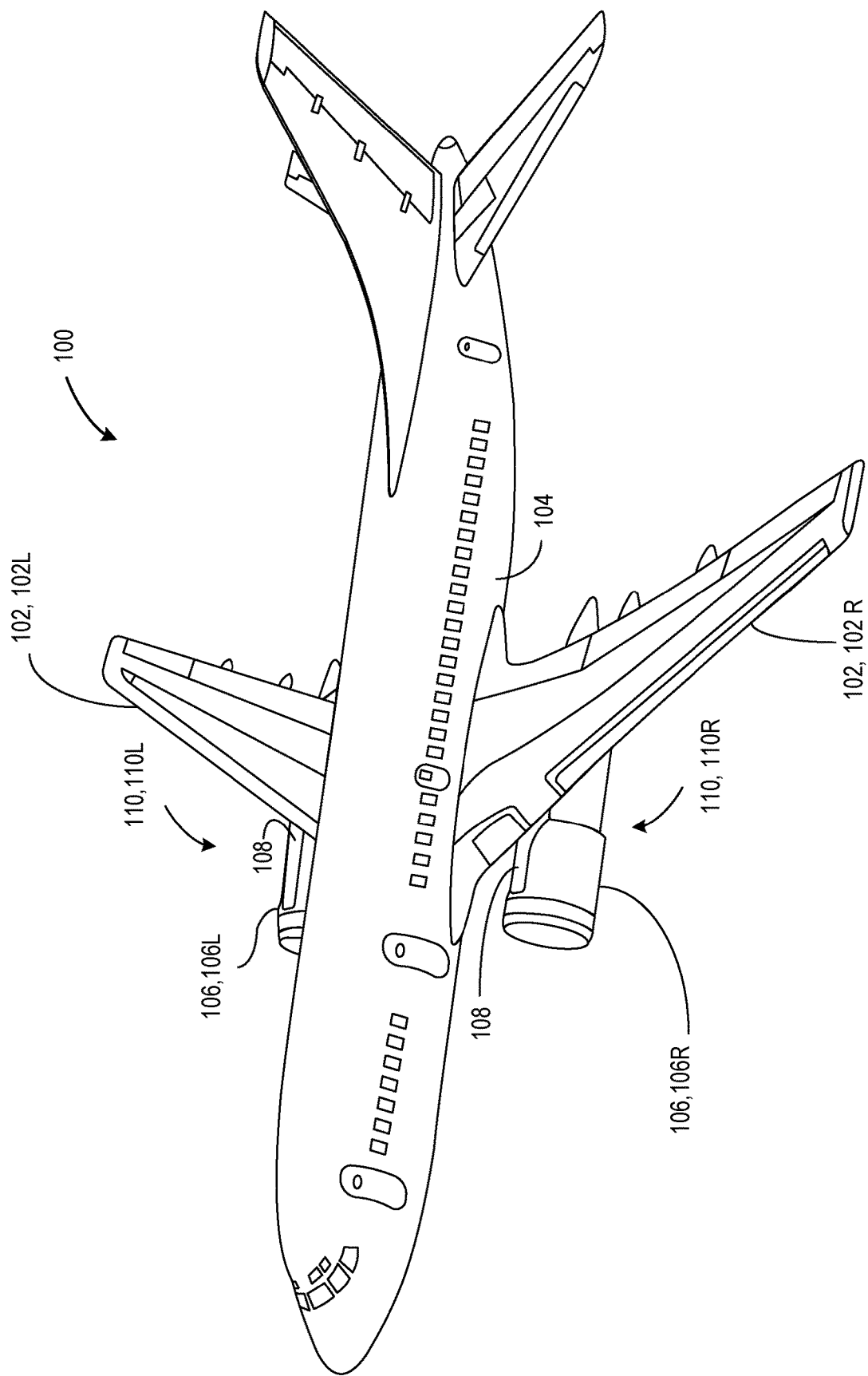
FIG. 1 is perspective view of an example aircraft including an example aircraft engine having an example thrust reverser system in accordance with teachings disclosed herein.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many known turbofan engines employ thrust reverser mechanisms to decelerate an aircraft upon landing. The thrust reverser mechanisms reduce the forward thrust produced by the turbofan engine and, thus, reduce the speed of the aircraft. In some examples, the thrust reversers redirect airflow through the nacelle that would otherwise produce forward thrust. For example, airflow that would otherwise be ejected from a rear of the engine to produce forward thrust is redirected to exit the nacelle in a circumferentially outward and/or generally forward direction via a cascade system of a thrust reverser system. In some examples, a door is positioned in the nacelle to redirect the airflow through the engine toward the thrust reverser mechanism.

Turbofan engines employ thrust reverser systems that are designed to output exhaust flow (e.g., efflux) in certain directions (e.g., a forward flow vector and/or a side flow vector). Exhaust flow from the thrust reverser systems is vectored to generate reverse thrust. Thus, the thrust reverser is integrated with the aircraft and engine. To direct exhaust flow in certain or desired directions, thrust reversers employ a cascade assembly, which contain vanes to direct a thrust reverser efflux (e.g., exhaust) in the desired directions. When installed under wings of an aircraft, the array of cascades point in different directions based on which airplane wing position the thrust reverser is installed. Thus, thrust reversers designed for transport category aircraft are unique to their position on the aircraft. For example, to provide a balanced output of exhaust flow at each engine of the aircraft, a cascade array is arranged such that output vectors of thrust reverser efflux is symmetric relative to a longitudinal plane (e.g., a vertical plane) passing through a longitudinal axis of a fuselage of an aircraft. In other words, cascade systems of thrust reverser systems are designed to output exhaust flow (e.g., a forward flow vector and/or a side flow vector) symmetric relative a longitudinal plane (e.g., a vertical plane) passing through the centerline of the fuselage. As a result of configuring a cascade system symmetric to the centerline of the fuselage, cascade systems result in cascade assemblies that are unique to each wing position and must have unique part assembly numbers to accommodate these configurations. For example, cascade assemblies for twin-engine aircrafts result in four sub-assembly halves for each aircraft engine. Thus, each aircraft engine has a unique pattern of cascade assemblies that manufacturers and/or customers stock in inventory. Such configuration increases manufacturing costs, manufacturing complexity by increasing number of parts, increasing maintenance complexity when changing cascades of a cascade system, and/or otherwise restricts interchangeability between cascades of the cascade systems. For example, each cascade of a cascade system is positioned in a unique orientation (e.g., a radial or annular position) of the cascade system.

Figure 12:
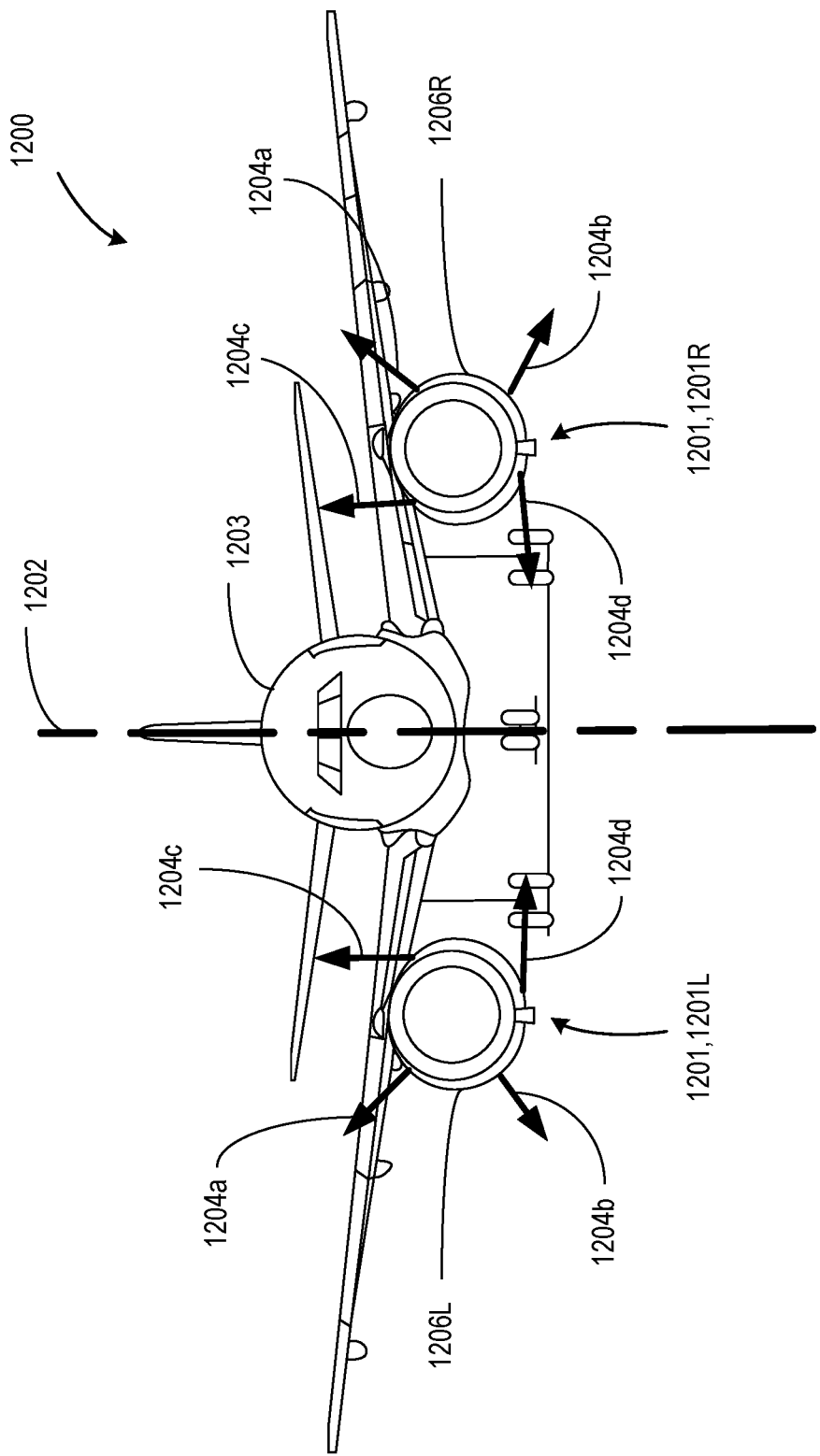
FIG. 12 is a front view of a known aircraft having a known cascade system that is symmetric relative to an example fuselage of the aircraft.

For example, FIG. 12 is a front view of a known aircraft 1200 having a known asymmetric thrust reverser system 1201 (e.g., a twin-engine commercial aircraft). As used herein, an asymmetric thrust reverser system is a thrust reverser system that is designed or oriented symmetrically relative to a vertical plane 1202 passing through a centerline (e.g., an aft-fore centerline) of a fuselage 1203 of the aircraft 1200. For example, in the illustrated example of FIG. 12, the aircraft 1200 includes a first aircraft engine 1206L having a first thrust reverser system 1201L and a second aircraft engine 1206R having a second thrust reverser system 1201R. The first thrust reverser system 1201L is a mirror image relative to the second thrust reverser system 1201R with respect to the vertical plane 1202 of the fuselage 1203. For example, each of the thrust reverser assemblies 1201L and 1201R generates a plurality of symmetric (e.g., summation) exhaust vectors 1204a-d. Respective ones of the exhaust vectors 1204a-d of the first aircraft engine 1206L are symmetric (e.g., a mirror image) to respective ones of the exhaust vectors 1204a-d of the second aircraft engine 1206R relative to the vertical plane 1202 of the fuselage 1203.

Figure 13:
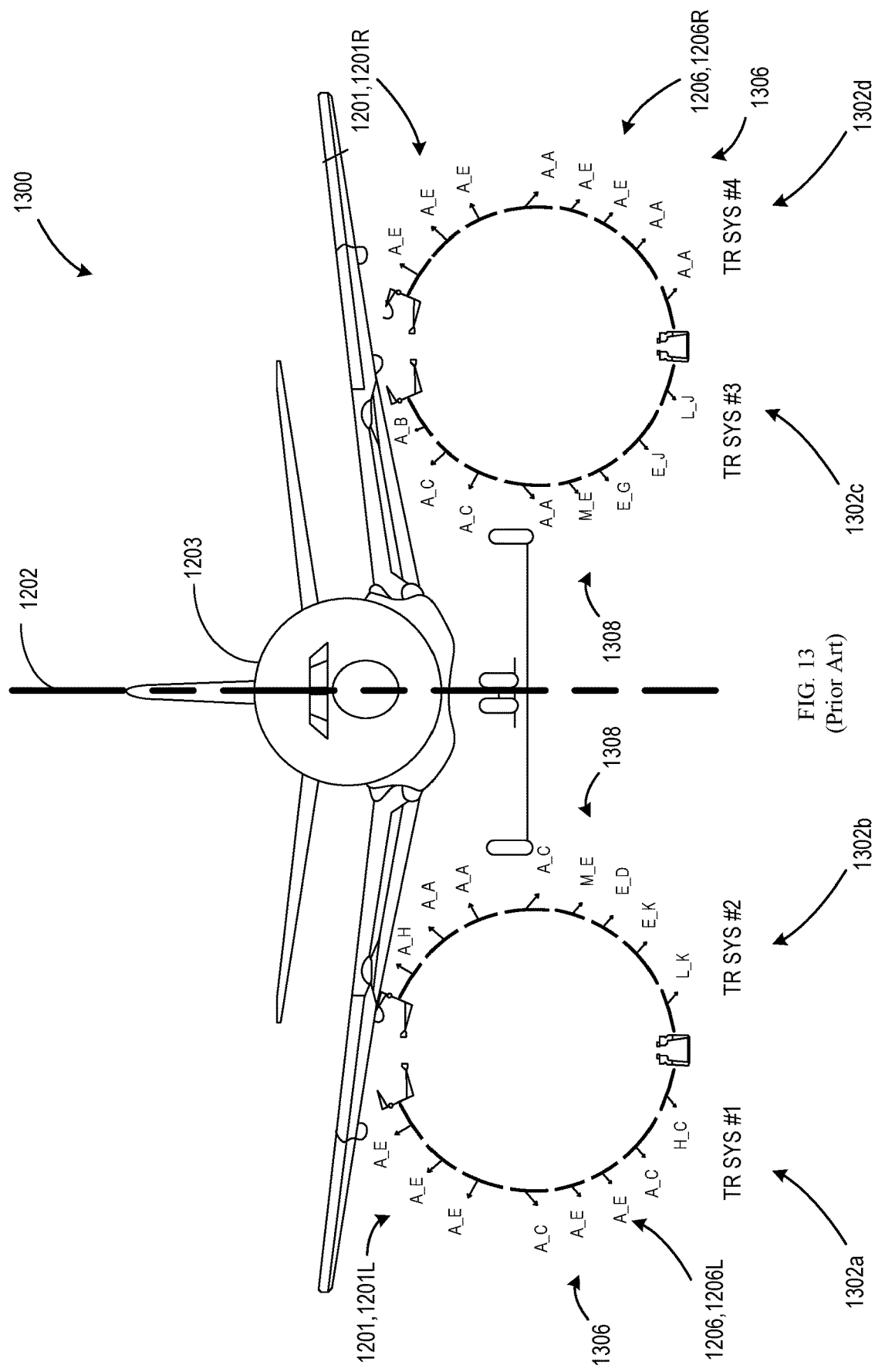
FIG. 13 is a front view of the known aircraft of FIG. 12 showing a schematic illustration of the known thrust reverser system.

FIG. 13 is a front view of the known aircraft of FIG. 12 showing a schematic illustration of the first thrust reverser system 1201L and the second thrust reverser system 1201R. To generate respective ones of the exhaust vectors 1204a-d (FIG. 12), the first thrust reverser system 1201L includes a first cascade assembly 1302a and a second cascade assembly 1302b, and the second thrust reverser system 1201R includes a third cascade assembly 1302c and a fourth cascade assembly 1302d. Each cascade assembly can include a single cascade or a plurality of cascades (e.g., more than one, three, four, eight etc.).

In the illustrated example, the first cascade assembly 1302a and the fourth cascade assembly 1302d are oriented toward an outboard side 1306 of the aircraft 1200 (e.g., in a direction away from the fuselage 1203) and the second cascade assembly 1302d and the third cascade assembly 1302c are oriented toward an inboard side 1308 of the aircraft 1200 (e.g., in a direction toward from the fuselage 1203). Thus, the first cascade assembly 1304a is a mirror image of the fourth cascade assembly 1304d relative to the vertical plane 1202, and the second cascade assembly 1304b is a mirror image of the third cascade assembly 1304c relative to the vertical plane 1202. In other words, the first cascade assembly 1304a is asymmetric to the second cascade assembly 1304b of the first engine 1201L, and the third cascade assembly 1304c is asymmetric to the fourth cascade assembly 1304d of the second engine 1201R. As a result, the respective first and second cascade assemblies 1304a-b of the first aircraft engine 1206L are different relative to the respective third and fourth cascade assemblies 1304a-d of the second aircraft engine 1206R. A disadvantage of different thrust reverser assemblies requires use of four different cascade assemblies 1304a-d (e.g., two cascade assemblies for each aircraft engine). The use of such dedicated or different cascade assemblies is based on the asymmetric design of the thrust reverser system relative to the vertical plane 1202 of the fuselage 1203. For instance, because the summation exhaust vectors 1204a-d are mirror images relative to the vertical plane 1202, a cascade 1304 of the first cascade assembly 1304a of the first aircraft engine 1206L is not interchangeable with a cascade 1304 of the fourth cascade assembly 1304d even though the first cascade assembly 1304a and the fourth cascade assembly 1304e provide exhaust vectors 1204a (FIG. 12) that are mirror images of each other because the first cascade assembly 1304a and the fourth cascade assembly 1304d are located on respective outboard sides 1306 of the aircraft 1200 (e.g., away from the fuselage 1203). Thus, flipping, mirroring, rotating, or otherwise reorientating a cascade from the first cascade assembly 1304a and positioning on the second aircraft engine 1206R affects an orientation of the summation exhaust vector 1204a of the second aircraft engine 1204R because openings of the cascade are not in a proper orientation and/or a frame of the cascade is flipped, mirrored, rotated or otherwise reorientated (e.g., a left side is flipped, mirrored, rotated, or otherwise reorientated to the right side), thereby complicating maintenance and/or manufacturing. Thus, the flow characteristics of each thrust reverser assembly 1302a-d are all unique and are not interchangeable. As such, thrust reversers of known aircraft are unique to their position on the aircraft, which results in additional cost, complexity and higher part counts.

Example apparatus and methods disclosed herein provide thrust reverser systems having a single or common thrust reverser assembly (e.g., two thrust reverser halves) that can be applied to each aircraft engine on any wing position (e.g., irrespective of wing position) without needing to change or re-configure aerodynamic and/or structural features of cascades defining the thrust reverser assembly. In other words, each aircraft engine shares a common thrust reverser assembly and cascade array orientation or layout. Thus, example apparatus and methods disclosed herein provide a thrust reverser with a symmetric cascade pattern that could be installed on either wing position. Although an aircraft engine of a first wing and an aircraft engine of a second wing share or have the same cascade assembly or layout (e.g., the same output vectored flow), the thrust reverser systems disclosed herein provide a balanced output of exhaust flow at each engine of the aircraft. In other words, the output exhaust flow (e.g., a forward flow vector and/or a side flow vector) of a first engine on a first wing is symmetric with an output exhaust flow (e.g., a forward flow vector and/or a side flow vector) of a second engine on a second wing relative a longitudinal plane (e.g., a vertical plane) passing through a centerline of a fuselage.

To enable each aircraft engine (e.g., of a twin-engine aircraft) to share a common thrust reverser assembly, example thrust reverser systems disclosed herein are symmetric relative to a vertical plane passing through a centerline (e.g., a fore-aft centerline) of an aircraft engine. As a result, example thrust reverser systems disclosed herein can be installed on either wing position with no modification or configuration changes. For example, a cascade thrust reverser disclosed herein can be integrated on either wing position of a twin engine aircraft without any reconfiguration(s). Thus, each engine of a twin-engine aircraft can include a single thrust reverser assembly configuration. For example, a first engine can include a first thrust reverser assembly that is the same (e.g., identical) relative to a second thrust reverser assembly of a second engine. A common thrust reverser assembly for each aircraft engine reduces part count (e.g., cascades, hardware, etc.), manufacturing complexities, manufacturing logistics (e.g., trying to figure which cascade goes to which assembly) and/or manufacturing costs. For example, the example apparatus and methods disclosed herein reduces the risk of improperly installed cascades and reduces the number of parts (e.g., by providing the same parts for each engine) to be managed.

FIG. 1 is perspective view of an example aircraft 100 having an aircraft engine 106 in accordance with teachings disclosed herein. The aircraft 100 of FIG. 1 includes wings 102 (e.g., a first wing 102R and a second wing 102L) extending laterally outward from a fuselage 104. Each of the wings 102 of the illustrated example supports the aircraft engine 106 (e.g., a first aircraft engine 106L and a second aircraft engine 106R) via a pylon 108. Each aircraft engine 106 of the illustrated example is a turbofan engine that embodies a thrust reverser system 110 (e.g., a first thrust thruster system 110L, a second thrust reverser system 110R). The first aircraft engine 106L is substantially similar or identical to the second aircraft engine 106R.

Figure 2:
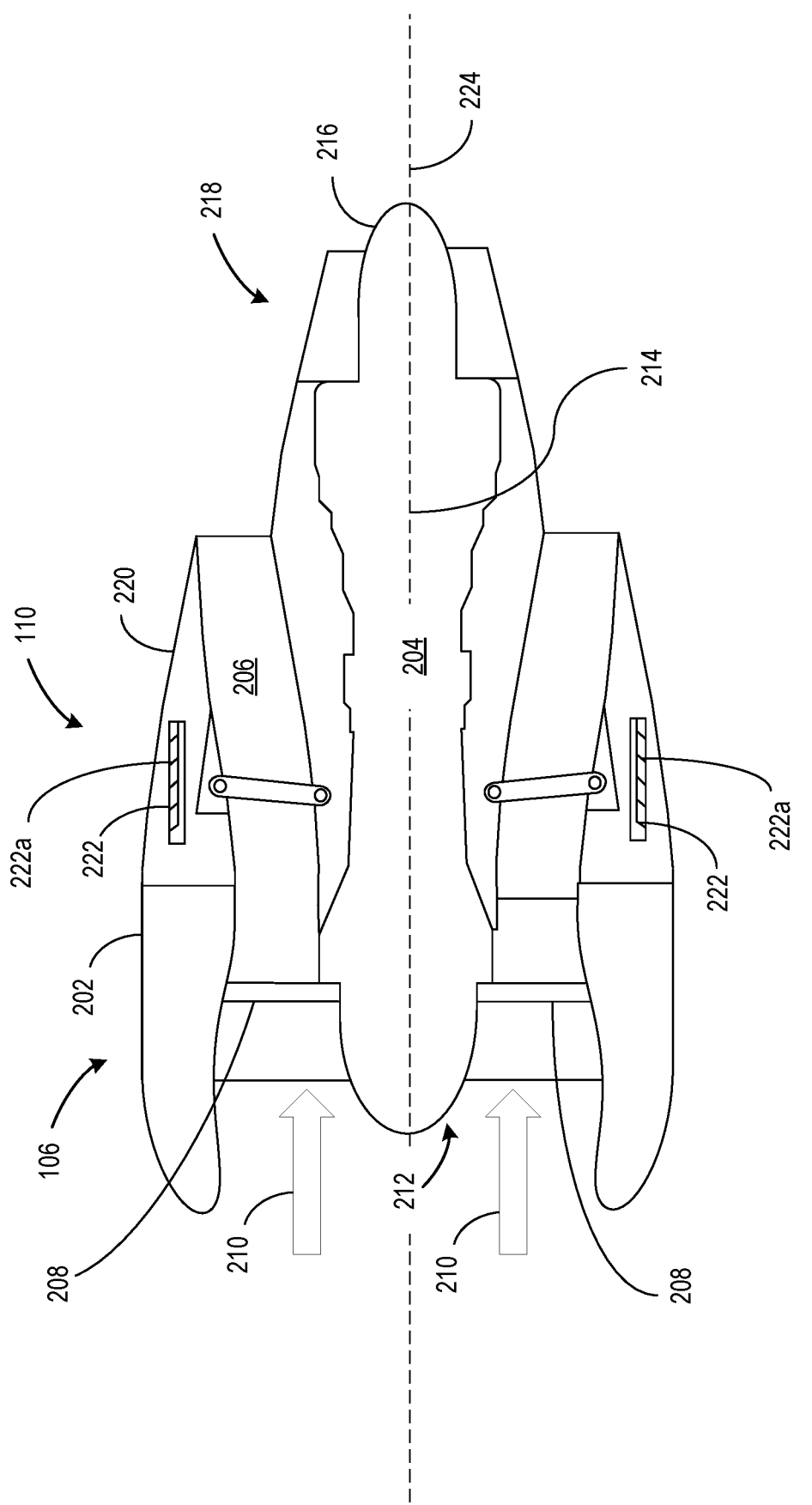
FIG. 2 is a cross-sectional view of the example aircraft engine of FIG. 1.

FIG. 2 is a cross-sectional view of the example aircraft engine 106 of FIG. 1. As illustrated in FIG. 2, the aircraft engine 106 includes a nacelle 202, an engine core 204, and a bypass 206 defined between the nacelle 202 and the engine core 204. The aircraft engine 106 is a gas turbine (e.g., a turbofan engine) having a fan 208 that draws airflow 210 into an air intake 212. A portion of the airflow 210 flows to the engine core 204 and a portion of the airflow 210 flows through the bypass 206. The air provided by the air intake 212 to the engine core 204 is highly pressurized (e.g., via a compressor) and provided to a combustion chamber 214 of the engine core 204, where fuel is injected and mixed with the highly pressurized air and ignited. The thermal energy from the combustion chamber 214 of the engine core 204 is exhausted (e.g., via a turbine) to a nozzle 216 where it mixes with a portion of the airflow (e.g., cool air) that was accelerated by the fan 208 through the bypass 206. The converted thermal energy of the engine core 204 and the accelerated airflow of the bypass 206 are exhausted from an aft end 218 of the engine 200 to produce forward thrust that provides lift and/or propels the aircraft 100 (e.g., in a forward direction).

The thrust reverser system 110 of the example aircraft engine 106 includes an outer sleeve or outer panel 220 that moves or actuates between a stowed position (e.g., a non-deployed position) and a deployed position to selectively cover or uncover a cascade system 222 of the example thrust reverser system 110. The cascade system 222 includes a plurality of cascades 222a circumferentially or radially spaced relative to a longitudinal axis 224 (e.g., a central axis extending in the fore-aft direction) of the aircraft engine 106. As illustrated in FIG. 2, the outer panel 220 of the thrust reverser system 110 forms a portion of the nacelle 202. As described in greater detail below, airflow in the bypass 206 is unaffected by the thrust reverser system 110 when the outer panel 220 is in a stowed position (e.g., a non-deployed position 300 of FIG. 3) and, thus, the airflow of the bypass 206 flows toward the nozzle 216. When the thrust reverser system 110 is in a deployed position (e.g., a deployed position 400 of FIG. 4), airflow (e.g., a portion or substantially all of the airflow) flowing through the bypass 206 is directed or diverted through the cascade system 222 circumferentially outward from the nacelle 202 and/or away from the aft end 218 to produce reverse thrust.

Figure 3:
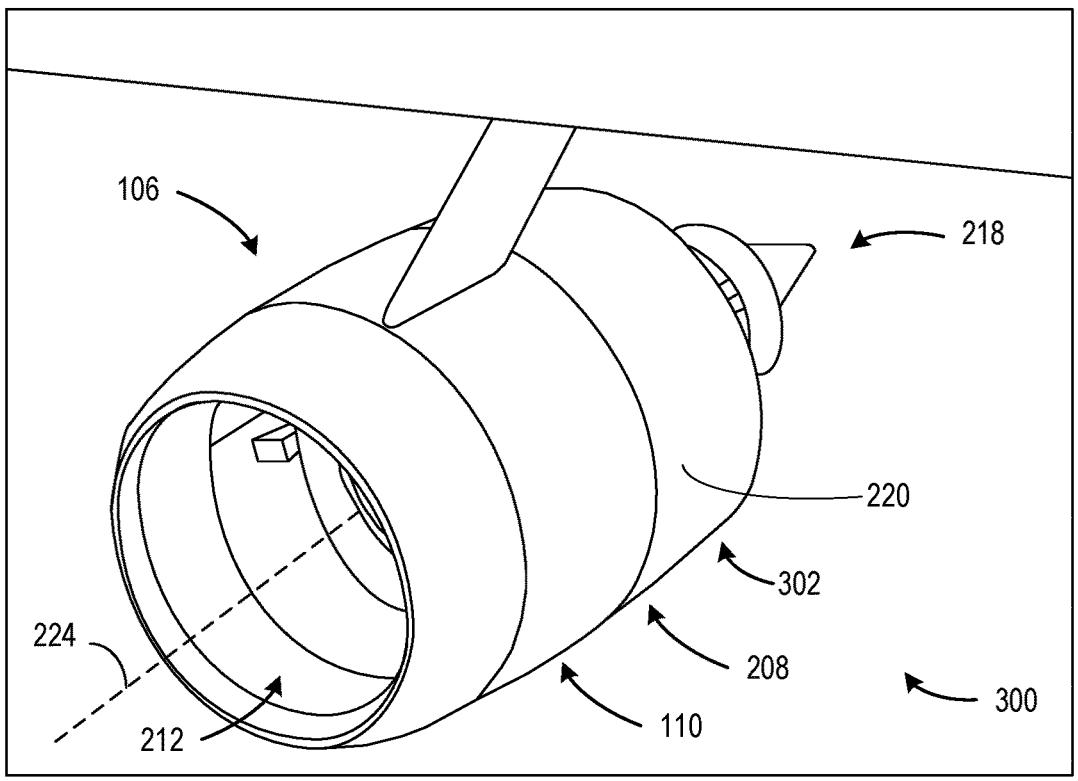
FIG. 3 is a partial perspective view of the example aircraft of FIG. 1 with the example thrust reverser system of the example aircraft engine in a non-deployed position.

FIG. 3 is a partial perspective view of the example aircraft of FIG. 1 with the example thrust reverser system 110 of the example aircraft engine 106 in the example non-deployed position 300. In the non-deployed position 300, the outer panel 220 is in a stowed or closed position 302. In the closed position 302, the outer panel 220 covers the cascade system 222 (FIG. 2) to prevent air in the bypass 206 (FIG. 2) from being directed or diverted through the cascade system 222 (FIG. 2). In other words, the airflow 210 (FIG. 2) from the air intake 212 that flows through the bypass 206 (FIG. 2) is prevented from flowing circumferentially outward from the aircraft engine 106. Instead, the airflow 210 (FIG. 2) from the air intake 212 flows through the bypass 206 (FIG. 2) in a direction substantially parallel to the longitudinal axis 224 of the aircraft engine 106 and, thus, exits the aircraft engine 106 via the aft end 218 of the aircraft engine 106. As a result of the outer panel 220 being in the closed position 302, the cascade system 222 (FIG. 2) is prevented from producing thrust reverser (i.e., the thrust reverser system 110 is in the non-deployed position 300). Thus, FIG. 3 illustrates an aircraft engine 106 providing forward thrust.

Figure 4:
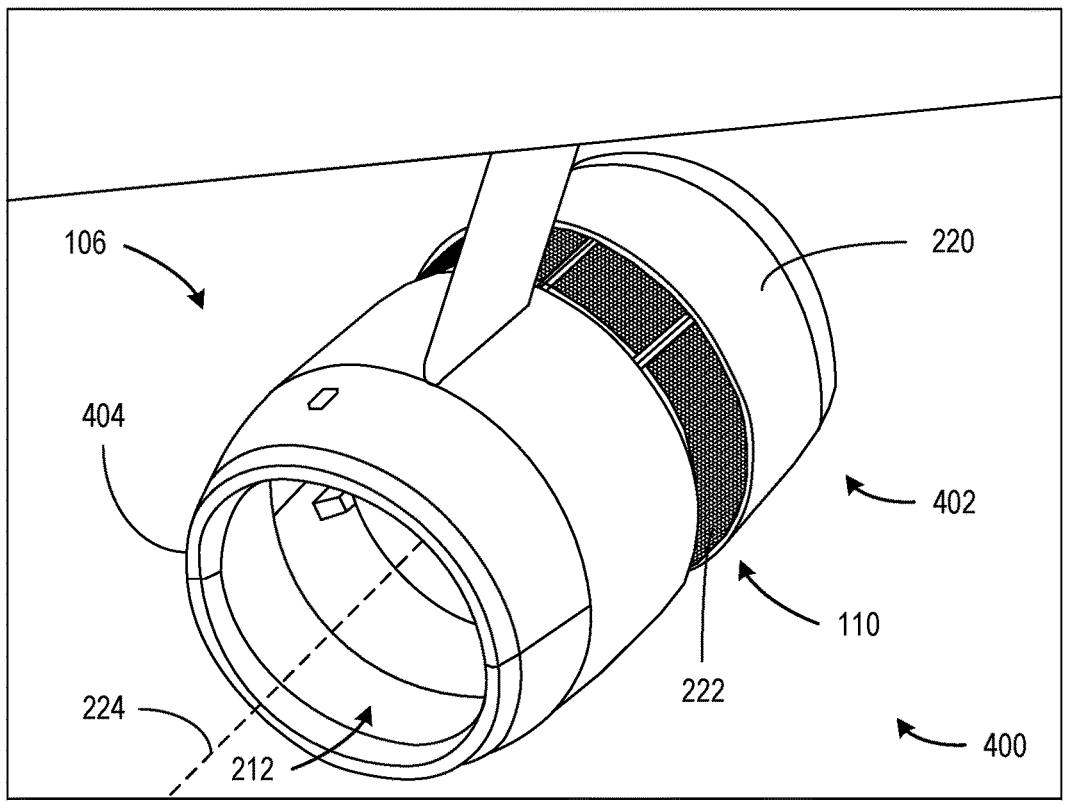
FIG. 4 is a partial perspective view of the example aircraft of FIG. 1 with the example thrust reverser system in a deployed position.

FIG. 4 is a partial perspective view of the example aircraft of FIG. 1 with the example thrust reverser system 110 of the example aircraft engine 106 in the example deployed position 400. As illustrated in FIG. 4, the outer panel 220 is in an activated or open position 402 to expose the cascade system 222 of the thrust reverser system 110. When the cascade system 222 is exposed, a portion and/or substantially all of the airflow 210 of the bypass 206 (FIG. 2) is directed or diverted in a direction non-parallel relative to the longitudinal axis 224 of the aircraft engine 106. For example, the cascade system 222 of the illustrated example directs airflow from the bypass 206 circumferentially outward and/or substantially toward a front end 404 (i.e., toward the air intake 212) of the aircraft engine 106 to enable the aircraft engine 106 to produce reverse thrust.

Figure 5:
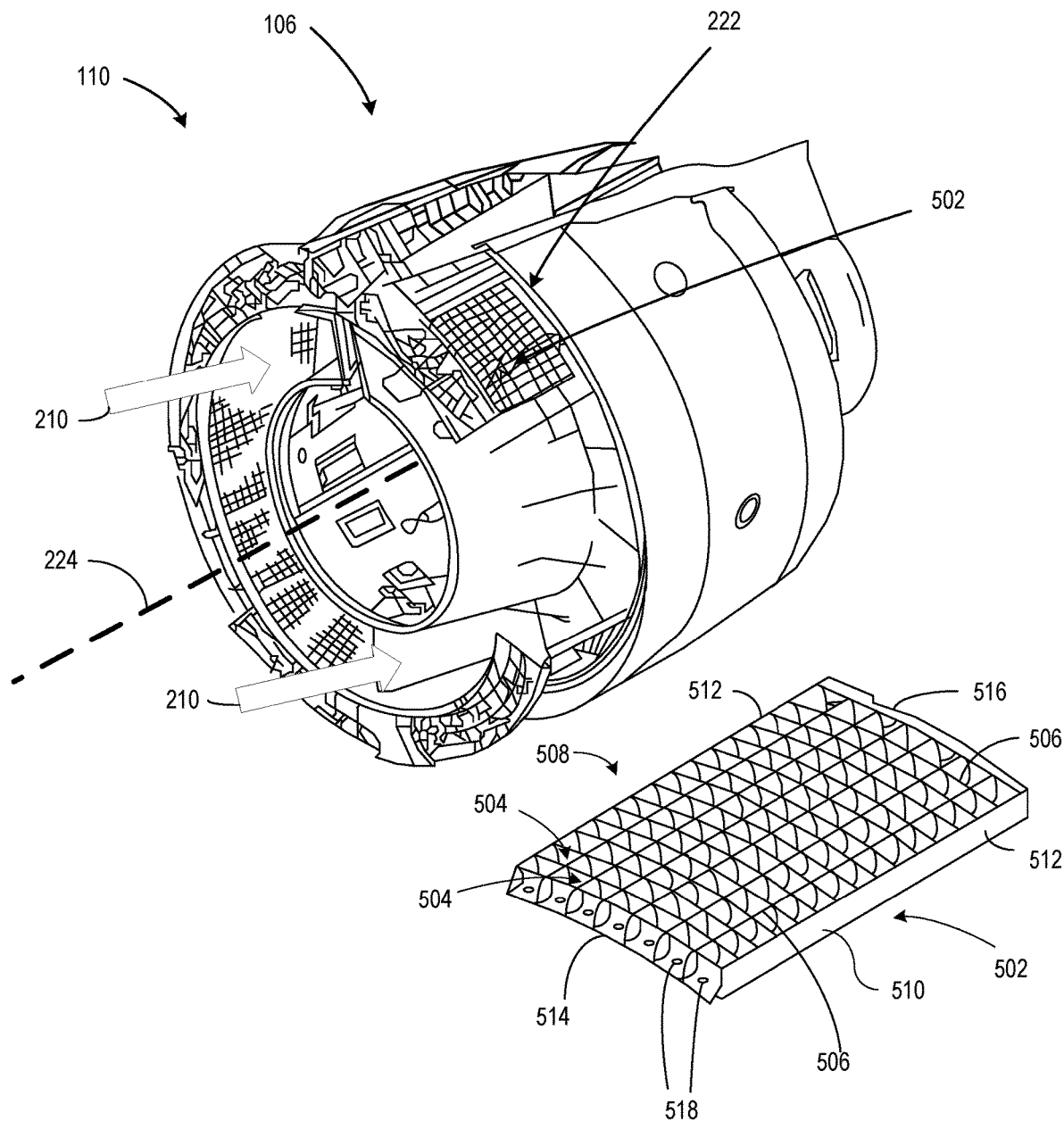
FIG. 5 is a partial assembled view of the example aircraft engine FIG. 1 showing an example cascade system of the example thrust reverser system.

FIG. 5 is a partial assembled view of the example aircraft engine 106 of FIG. 1 showing the example cascade system 222 of the example thrust reverser system 110. The cascade system 222 of the illustrated example include a plurality of cascades 502 (e.g., segments) spaced circumferentially relative to the longitudinal axis 224 of the aircraft engine 106. To direct (e.g., redirect) airflow 210 to produce reverse thrust, each of the cascades 502 includes a plurality of vanes 506 defining openings 504. The vanes 506 turn the airflow 210 at desired angles in a forward direction and/or a side direction (e.g., as described in FIGS. 6 and 7). For instance, the cascades 502 define a cascade pattern 508 (e.g., an angle of the vanes 506, the number of openings 504, etc.) to provide a desired output flow exhaust vector (e.g., efflux). For instance, the output flow exhaust vectors of each cascade 502 or a set or group of cascades 502 can be defined having a cascade forward turning angle relative to an angle referenced to engine radial and a cascade side turning angle relative to an angle referenced to engine radial. In some examples, the forward angle can be between approximately 0 degrees and 50 degrees and the side turning angle can be between approximately −60 degrees and 60 degrees. The exhaust flow is typically directed toward a fore end of the aircraft 100 (FIG. 1) and/or the aircraft engine 106 (FIG. 1) and toward a side of the aircraft 100 (FIG. 1) and/or the aircraft engine 106 (FIG. 1). Thus, each one of the cascades can be classified based on cascade forward and cascade side turning angles relative to engine radial. Thus, based on the output exhaust vectors provided by the cascades 502 and/or group of cascades 502, each of the cascades 502 has a unique circumferential or radial position about the circumference of the aircraft engine 106 (FIG. 1) to provide the desired exhaust vector. In some examples, each cascade system 222 of the illustrated example is oriented in a specific radial or circumferential position for each aircraft model (e.g., a Boeing 777 aircraft, a Boeing 737 aircraft). To attach the cascade 502 to the aircraft engine 106, the cascade 502 includes a frame 510. The frame 510 has opposing lateral surfaces 512, and a first edge 514 opposite a second edge 516 (e.g., a rectangular or square shape). The first edge 514 includes a plurality of mounting holes 518 to receive fasteners for mounting the cascade 502 to the aircraft engine 106. In some examples, the second edge 516 includes mounting holes (e.g., similar to the mounting holes 518) for mounting the cascade 502 to the aircraft engine 106.

Figure 6:
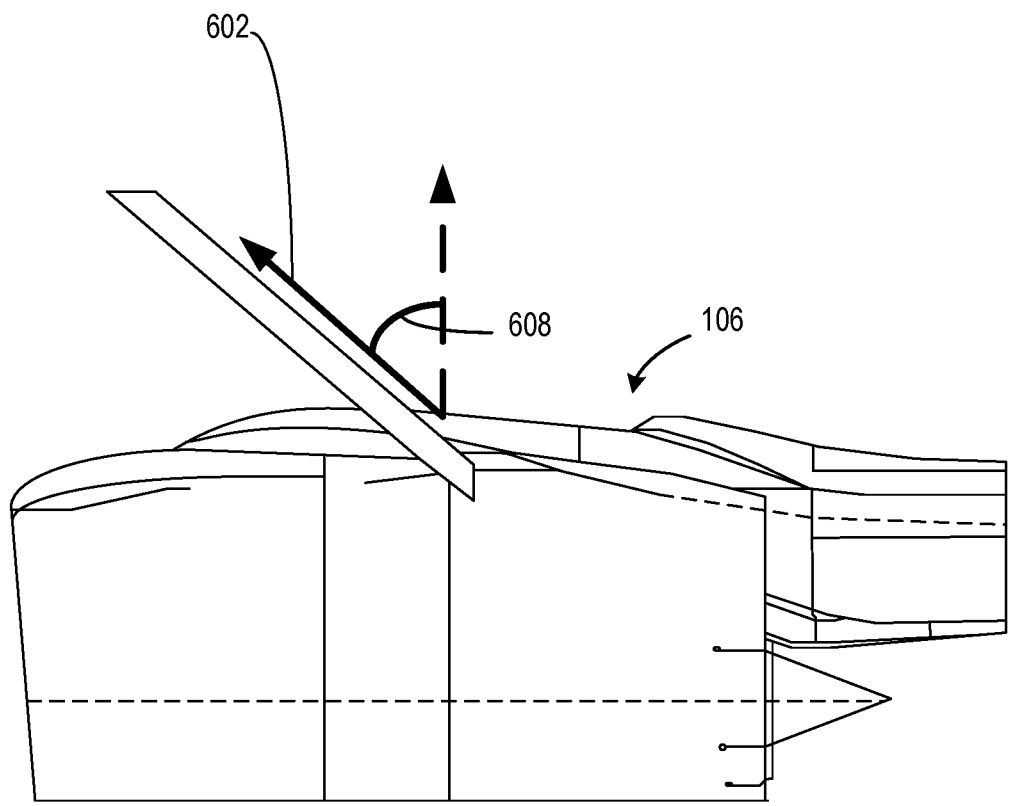
FIG. 6 is a side view of the example aircraft engine FIG. 1 showing a schematic example cascade forward turning exhaust vector of the example thrust reverser system relative to engine radial.
Figure 7:
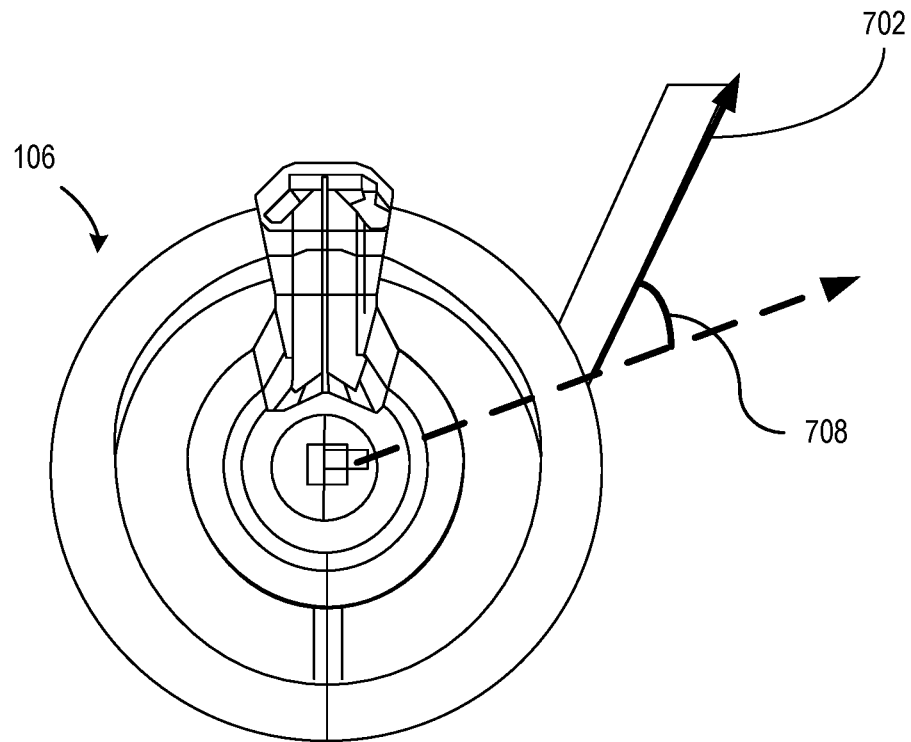
FIG. 7 is a front view of the example aircraft engine FIG. 1 showing a schematic example cascade side turning exhaust vector of the example thrust reverser system relative to engine radial.

FIG. 6 is a side view of the example aircraft engine 106 of FIG. 1. FIG. 7 is a front view of the example aircraft engine 106 of FIG. 1. As noted above in FIG. 5, each cascade 502 of FIG. 5 can be configured to output exhaust vectors to optimize the integration of the thrust reverser with the airplane and engine to create thrust generated by the thrust reversers system 110 (FIG. 1). Typically, each of the cascades 502 can be configured to provide one or more exhaust vectors. For example, each of the cascades 502 of the illustrated example can be classified or identified with a forward turning vector 602 and a side turning vector 702 relative to engine radial. For example, as illustrated in FIGS. 6 and 7, the cascade pattern 508 of a first one of the cascades 502 of FIG. 5 provides the cascade forward turning vector 602 relative to engine radial and the cascade side turning vector 702 relative to engine radial. The cascade forward turning vector 602 is directed forward to provide a forward thrust and the cascade side turning vector 702 is directed sideways to ensure exhaust from the thrust reverser system 110 does not interfere with aerodynamic features or other components of the aircraft (e.g., the wings 102 (FIG. 1), the fuselage 104 (FIG. 1)). The cascade forward turning vector 602 of the illustrated example has an angle 608 relative to engine radial and the cascade side turning vector 702 of the illustrated example has an angle 708 relative to engine radial. The angle 608 of the illustrated example can be between approximately 0° and 50° and the example angle 708 of the illustrated example can be between approximately −60° to 60°. However, the angle 608 and the angle 708 are not limited to the example angle 608 and to the example angle 708 illustrated in FIGS. 6 and 7 and can include different angles. Each cascade 502 of the thrust reverser system 110 can be configured to provide different exhaust vectors or similar exhaust vectors as shown in FIGS. 6 and 7. The other ones of the cascades 502 of FIG. 5 can be configured to have different cascade angles.

Figure 8:
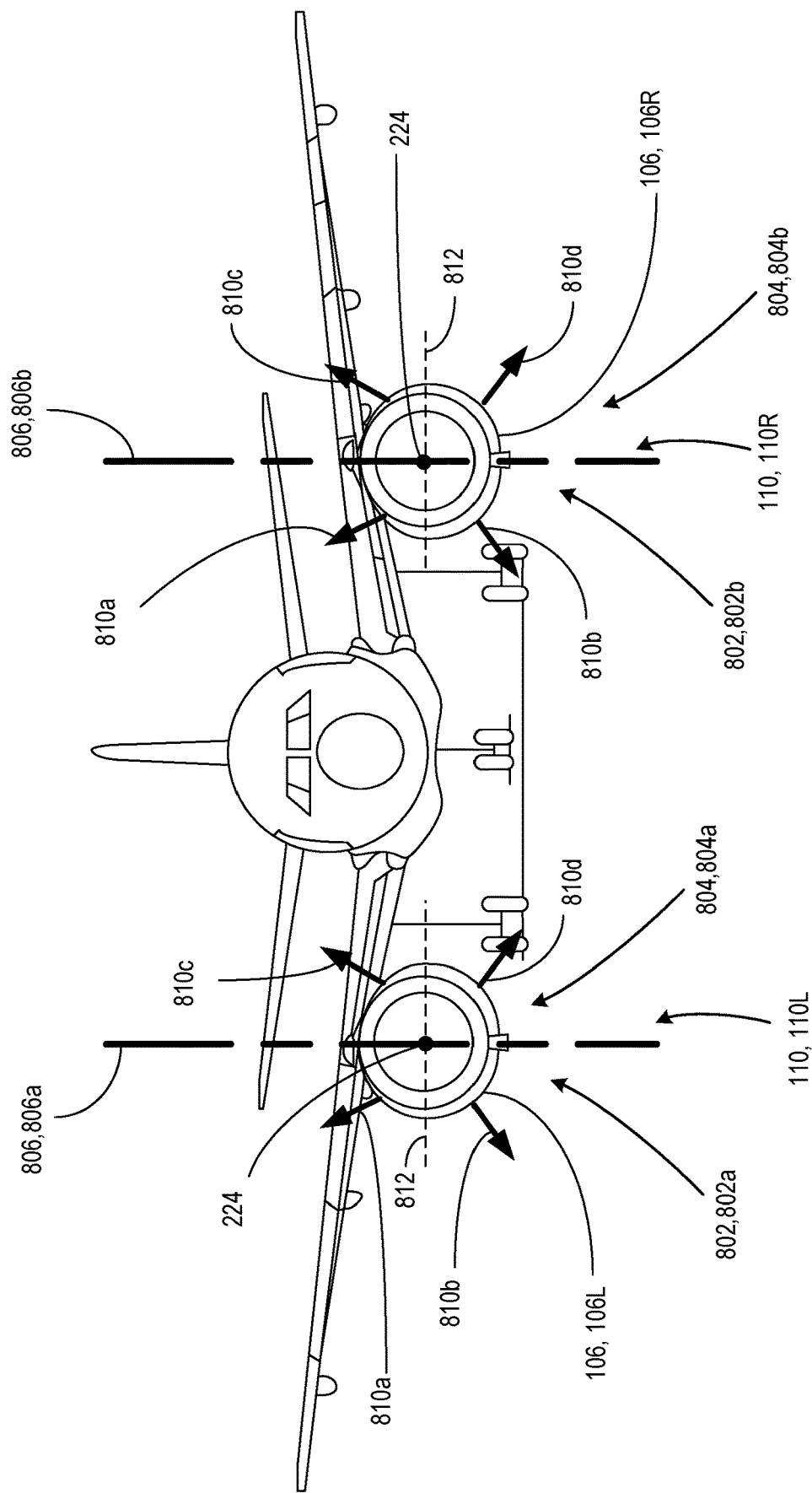
FIG. 8 is a front view of the example aircraft of FIG. 1 showing schematic illustrations of the example exhaust vectors of the example thrust reverser system.

FIG. 8 is a front view of the example aircraft 100 of FIG. 1 showing schematic illustrations of example exhaust vectors 810a-d of the example thrust reverser systems 110. The thrust reverser systems 110 of the illustrated example is a symmetric thrust reverser system. As used herein, a symmetric thrust reverser system is a thrust reverser system that is designed or oriented symmetrically relative to a vertical plane 806 (e.g., a first vertical plane 806a of the first aircraft engine 106L and second vertical plane 806b of the second aircraft engine 106R) along (e.g., passing through and/or parallel to) the longitudinal axis 224 (e.g., an aft-fore centerline, a center point, etc.). In other words, the thrust reverser systems 110L and 110R are a mirror image with respect to the vertical plane 806 of the aircraft engine 106. The vertical plane 806 is spaced or offset from a vertical plane passing through a centerline of the fuselage. For example, each aircraft engine 106 includes a first thrust reverser assembly 802 and a second thrust reverser assembly 804. In the illustrated example, a first thrust reverser assembly 802a of the first aircraft engine 106L is symmetric (e.g., a mirror image) relative to a second thrust reverser assembly 804a of the first aircraft engine 106L with respect to the first vertical plane 806a passing through the longitudinal axis 224 (e.g., a fore-aft centerline) of the first aircraft engine 106L. Likewise, a first thrust reverser assembly 802b of the second aircraft engine 106R is symmetric (e.g., a mirror image) relative to a second thrust reverser assembly 804b of the second aircraft engine 106R with respect to the second vertical plane 806b passing through the longitudinal axis 224 (e.g., a fore-aft centerline) of the second aircraft engine 106R. As a result, each of the thrust reverser systems 110L, 110R generates a plurality of symmetric (e.g., summation) exhaust vector 810a-d relative to the respective first and second vertical planes 806a, 806b. The exhaust vectors 810a-b of the first aircraft engine 106L are symmetric (e.g., a mirror image) relative to the exhaust vectors 810c-d with respect to the first vertical plane 806, and the exhaust vectors 810a-b of the second aircraft engine 106R are symmetric (e.g., a mirror image) relative to the exhaust vectors 810c-d with respect to the second vertical plane 806b. For instance, in the illustrated example, the exhaust vector 810a of the aircraft engine 106 is symmetric relative to the exhaust vector 810c with respect to the vertical plane 806, and the exhaust vector 810b is symmetric relative to the exhaust vector 810d with respect to the vertical plane 806. However, the exhaust vectors 810a, 810c of the illustrated example are not symmetric relative to the exhaust vectors 810b, 810d with respect to a transverse axis 812. The transverse axis 812 is a lateral axis that is non-parallel (e.g., perpendicular to) the longitudinal axis 224 of the aircraft engine 106. However, in some examples, the exhaust vectors 810a and 810c can be symmetric relative to the exhaust vectors 810b and 810d with respect to the transverse axis 812. Additionally, the thrust reverser system 110 provides a balanced output of exhaust flow at each engine of the aircraft 100. In other words, the output exhaust flow (e.g., the output exhaust vectors 810a-d) of the first engine 106a on the first wing 102L is symmetric with an output exhaust flow (e.g., the output exhaust vectors 810a-d) of the second engine 106L on the second wing relative a longitudinal plane (e.g., a vertical plane) passing through a centerline of the fuselage 104 (e.g., to balance the output of the exhaust flow).

Figure 9:
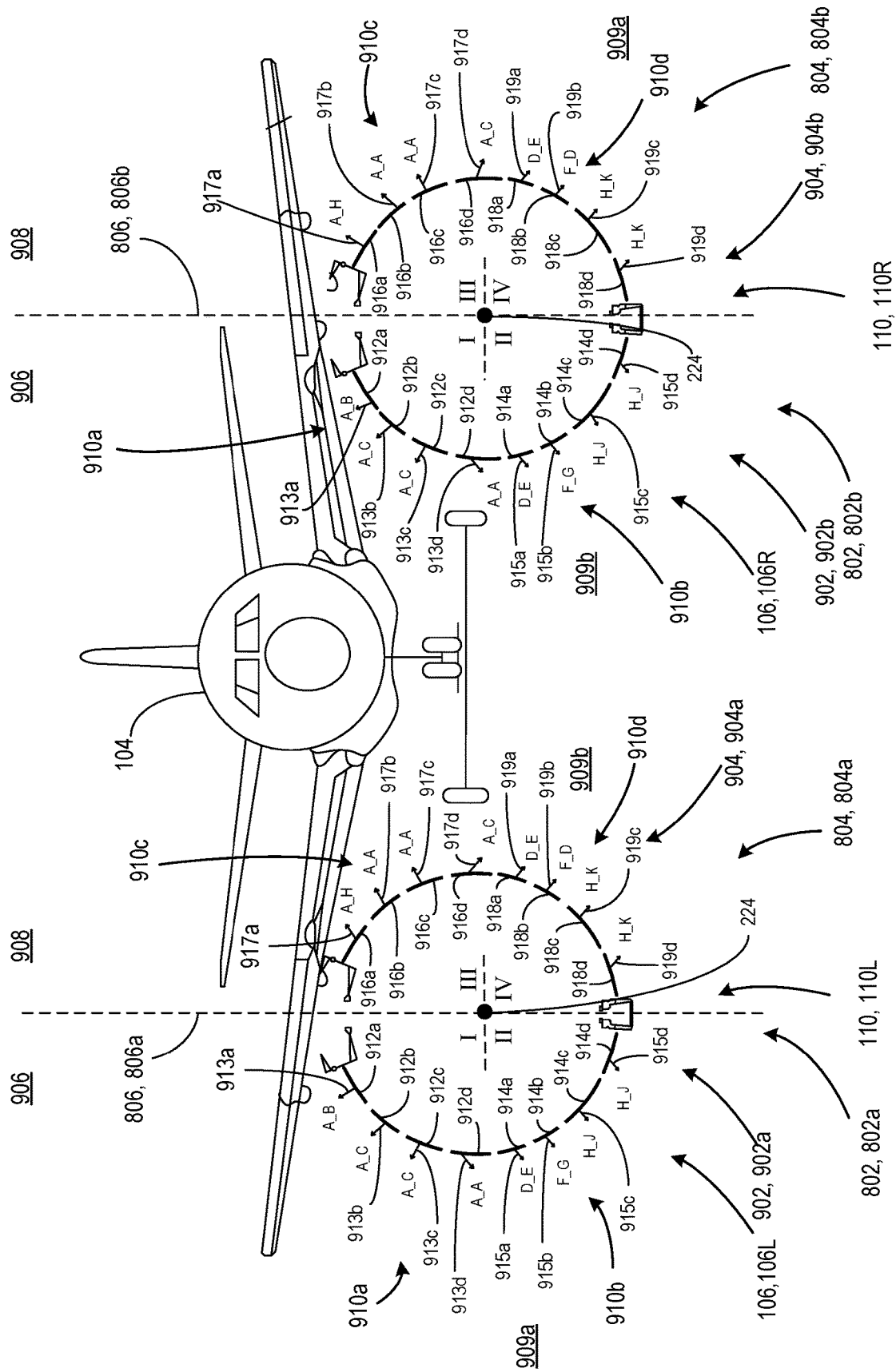
FIG. 9 is a front view of the example aircraft of FIGS. 1 and 8 showing a schematic illustration of the example thrust reverser system.

FIG. 9 is a front view of the example aircraft 100 of FIG. 1 showing a schematic illustration of the thrust reverser system 110 (e.g., the first thrust reverser assembly 802 and the second thrust reverser assembly 804). The first thrust reverser assembly 802 includes a first cascade assembly 902 and a second cascade assembly 904. Thus, each of the first aircraft engine 106L and the second aircraft engine 106R includes the first and second thrust reverser assemblies 802, 804. In other words, a first cascade assembly 902a of the first aircraft engine 106L is the same (e.g., identical) as a first cascade assembly 902b of the second aircraft engine 106R, and a second cascade assembly 904a of the first aircraft engine 106L is the same (e.g., identical) as a second cascade assembly 904b of the second aircraft engine 106R. For instance, the first cascade assembly (e.g., the cascade assemblies 902a) is positioned on a first side 906 (e.g., a left side in the orientation of FIG. 9) of the vertical plane 806 of the aircraft engine 106, and the second cascade assembly (e.g., the cascade assemblies 904b) are positioned on a second side 908 (e.g., a right side in the orientation of FIG. 9) of the vertical plane 806 of the aircraft engine 106. In this manner, the first cascade assembly 902a of the first aircraft engine 106L is oriented toward, an outboard side 909a of the aircraft 100 (e.g., in a direction away from the fuselage 104) and the first cascade assembly 902a of the second aircraft engine 106R is oriented toward an inboard side 909b of the aircraft 100 (e.g., a direction toward the fuselage 104). Similarly, the second cascade assembly 904b of the first aircraft engine 106L is oriented toward the inboard side 909b of the aircraft 100 and the second cascade assembly 904b of the second aircraft engine 106R is oriented toward the outboard side 909a of the aircraft 100.

The first cascade assembly 902 of the illustrated example includes a first cascade sub-assembly 910a and a second cascade sub-assembly 910b. The second cascade assembly 904 includes a third cascade sub-assembly 910c and a fourth cascade sub-assembly 910d. Flow characteristics (e.g., that provide the exhaust vectors 810a-d of FIG. 8) of respective ones of the cascade sub-assemblies 910a-d of the first thrust reverser system 110L are the same as the flow characteristics (e.g., that produce the exhaust vectors 810a-d) of the respective ones of the cascade sub-assemblies 910a-d of the second thrust reverser system 110R. For instance, flow characteristics (e.g., the exhaust vector 810a) of the first cascade sub-assembly 910a of the first thrust reverser system 110L (e.g., of the first aircraft engine 106L) are the same as flow characteristics (e.g., the exhaust vector 810a) of the first cascade sub-assembly 910a of the second thrust reverser system 110R (e.g., of the second aircraft engine 106R). Similarly, flow characteristics (e.g., the exhaust vector 810b) of the second cascade sub-assembly 910b of the first thrust reverser system 110L are the same as flow characteristics (e.g., the exhaust vector 810b) of the second cascade sub-assembly 910b of the second thrust reverser system 110R. Likewise, flow characteristics (e.g., the exhaust vector 810c) of the third cascade sub-assembly 910c of the first thrust reverser system 110L are the same as flow characteristics (e.g., the exhaust vector 810c) of the third cascade sub-assembly 910c of the second thrust reverser system 110R. Also, flow characteristics (e.g., the exhaust vector 810d) of the fourth cascade sub-assembly 910d of the first thrust reverser system 110L are the same as flow characteristics (e.g., the exhaust vector 810d) of the fourth cascade sub-assembly 910d of the second thrust reverser system 110R.

In the illustrated example, the first cascade sub-assembly 910a of the first aircraft engine 106L is oriented in the same orientation as the first cascade sub-assembly 910a of the second aircraft engine 106R relative to the vertical planes 806a, 806b of the respective first and second aircraft engines 106L, 106R. The first cascade sub-assembly 910a includes a plurality of cascades 912a-d circumferentially or radially spaced relative to the longitudinal axis 224 of the respective aircraft engines 106L, 106R. Specifically, each one of the cascades 912a-d is in a unique or specific circumferential position about the aircraft engine 106 or radial position relative to the longitudinal axis 224 such that respective ones of the cascades 912a-d are configured (e.g., via a pattern similar to the pattern 508 of FIG. 5) to provide or output respective ones of exhaust vectors 913a-d. When coupled to the first aircraft engine 106L, a respective one of the cascades 912a-d is configured to provide a corresponding one of exhaust vectors 913a-d.

The second cascade sub-assembly 910b of the first aircraft engine 106L of the illustrated example is oriented in the same orientation as the second cascade sub-assembly 910b of the second aircraft engine 106R relative to the vertical planes 806a, 806b of the respective first and second aircraft engines 106L, 106R. The second cascade sub-assembly 910b includes a plurality of cascades 914a-d circumferentially or radially spaced relative to the longitudinal axis 224 of the respective first and second aircraft engines 106L, 106R. Specifically, each one of the cascades 914a-d is in a unique or specific circumferential position about the aircraft engine 106 or radial position relative to the longitudinal axis 224 such that respective ones of the cascades 914a-d are configured (e.g., via a pattern similar to the pattern 508 of FIG. 5) to provide or output respective ones of exhaust vectors 915a-d. When coupled to the aircraft engine 106, a respective one of the cascades 914a-d is configured to provide a corresponding one of exhaust vectors 915a-d.

Likewise, the third cascade sub-assembly 910c of the first aircraft engine 106L of the illustrated example is oriented in the same orientation as the third cascade sub-assembly 910c of the second aircraft engine 106R relative to the vertical planes 806a, 806b of the respective first and second aircraft engines 106L, 106R. The third cascade sub-assembly 910c includes a plurality of cascades 916a-d circumferentially or radially spaced relative to the longitudinal axis 324 of the respective aircraft engines 106L, 106R. Specifically, each one of the cascades 916a-d is in a unique or specific circumferential position about the aircraft engine 106 or radial position relative to the longitudinal axis 224 such that respective ones of the cascades 916a-d are configured (e.g., via a pattern similar to the pattern 508 of FIG. 5) to provide or output respective ones of exhaust vectors 917a-d. When coupled to the aircraft engine 106, a respective one of the cascades 916a-d is configured to provide a corresponding one of exhaust vectors 917a-d.

Similarly, for example, the fourth cascade sub-assembly 910d of the first aircraft engine 106L of the illustrated example is oriented in the same orientation as the fourth cascade sub-assembly 910d of the second aircraft engine 106R relative to the vertical planes 806a, 806b of the respective first and second aircraft engines 106L, 106R. The fourth cascade sub-assembly 910d includes a plurality of cascades 918a-d circumferentially or radially spaced relative to the longitudinal axis 324 of the respective aircraft engines 106L, 106R. Specifically, each one of the cascades 918a-d is in a unique or specific circumferential position about the aircraft engine 106 or radial position relative to the longitudinal axis 224 such that respective ones of the cascades 918a-d are configured (e.g., via a pattern similar to the pattern 508 of FIG. 5) to provide or output respective ones of exhaust vectors 919a-d. When coupled to the aircraft engine 106, a respective one of the cascades 918a-d is configured to provide a corresponding one of exhaust vectors 919a-d.

The cascades 912a-d of the first cascade sub-assembly 902a are positioned in a first quadrant (I) of the first aircraft engine 106L and a first quadrant (I) of the second aircraft engine 106R. The cascades 914a-d of the second cascade sub-assembly 902b are positioned in a second quadrant (II) of the first aircraft engine 106L and a second quadrant (II) of the second aircraft engine 106R. The cascades 916a-d of the third cascade sub-assembly 902c are positioned in a third quadrant (III) of the first aircraft engine 106L and a third quadrant (III) of the second aircraft engine 106R. The cascades 918a-d of the fourth cascade sub-assembly 902d are positioned in a fourth quadrant (IV) of the first aircraft engine 106L and a fourth quadrant (IV) of the second aircraft engine 106R. For orientation purposes, the first and third quadrants (I) and (III) are positioned above the transverse axis 812 (FIG. 8) in the orientation of FIG. 9, and the second and fourth quadrants (II) and (IV) are positioned below the transverse axis 812. The first and second quadrants (I) and (II) are positioned on the first side 906 of the vertical plane 806 in the orientation of FIG. 9, and the third and fourth quadrants (III) and (IV) are positioned on the second side 908 of the vertical plane 806 in the orientation of FIG. 9. As a result, respective ones of the exhaust vectors 913a-d and 915a-d are symmetric (e.g., a mirror image) relative to the respective ones of the exhaust vectors 917a-d and 919a-d with reference to the vertical plane 806 passing through the longitudinal axis 224 (FIG. 2). In this manner, the cascades 912a-d, 914a-d (e.g., the exhaust vectors 913a-d, 915a-d) of the respective first cascade sub-assembly 910a and the second cascade assembly 910b of the first aircraft engine 106L are identical relative to the cascades 912a-d, 914a-d (e.g., the exhaust vectors 913a-d, 915a-d) of the respective first cascade sub-assembly 910a and the second cascade sub-assembly 910b of the second aircraft engine 106R. Also, the cascades 916a-d, 918a-d (e.g., the exhaust vectors 917a-d, 919a-d) of the respective third cascade sub-assembly 910c and the fourth cascade assembly 910d of the first aircraft engine 106L are identical relative to the cascades 916a-d, 918a-d (e.g., the exhaust vectors 917a-d, 919a-d) of the respective third cascade sub-assembly 910c and the fourth cascade sub-assembly 910d of the second aircraft engine 106R. Aa a result, a forward turning angle and a side turning angle of respective ones of the exhaust vectors 913a-d, 915a-d, 917a-d, 919a-d of the first thrust reverser system 110L are identical to a forward turning angle and a side turning angle of respective ones of the exhaust vectors 913a-d, 915a-d, 917a-d, 919a-d of the second thrust reverser system 110R. Example forward and side turning angles are provided in FIG. 9 as an example. The example forward and side turning angle values of FIG. 9 are provided for example purposes only and other examples can include any other values.

Thus, the cascades 912a-d and 914a-d of the first cascade assembly 910a of the first aircraft engine 106L are in the same orientation and/or radial position as the cascades 912a-d and 914a-d of the first cascade assembly 910a of the second aircraft engine 106R. The cascades 916a-d and 918a-d of the second cascade assembly 910b of the first aircraft engine 106L are in the same orientation and/or radial position as the cascades 916a-d and 918a-d of the second cascade assembly 910b of the second aircraft engine 106R. In other words, the cascades 912a-d, 914a-d of the first cascade assembly 910a are positioned on the first side 906 of the first vertical plane 806a of the first aircraft engine 106L, and the cascades 912a-d, 914a-d of the first cascade assembly 910a of the second aircraft engine 106R are positioned on the first side 906 of the vertical plane 806b (i.e., the first side 906 of the first vertical plane 806a is the same as the first side 906 of the second vertical plane 806b). The cascades 916a-d, 918a-d of the second cascade assembly 910b are positioned on the second side 908 of the first vertical plane 806a of the first aircraft engine 106L, and the cascades 916a-d, 918a-d of the second cascade assembly 910b of the second aircraft engine 106R are positioned on the second side 908 of the vertical plane 806b. The second side 908 of the first vertical plane 806a is the same as the second side 908 of the second vertical plane 806b. The first side 906 of the first vertical plane 806a is opposite the second side 908 of the first vertical plane 806a, and the first side 906 of the second vertical plane 806b is opposite the second side 908 of the second vertical plane 806b.

As a result, respective ones of cascades 912a-d of the first aircraft engine 106L are interchangeable with respective ones of cascades 912a-d of the second aircraft engine 106R, respective ones of cascades 914a-d of the first aircraft engine 106L are interchangeable with respective ones of cascades 914a-d of the second aircraft engine 106R, respective ones of cascades 916a-d of the first aircraft engine 106L are interchangeable with respective ones of cascades 916a-d of the second aircraft engine 106R, and respective ones of cascades 918a-d of the first aircraft engine 106L are interchangeable with respective ones of cascades 918a-d of the second aircraft engine 106R.

Thus, by orienting or designing a cascade layout relative to the vertical plane 806 of the aircraft engine 106, a layout or orientation of the cascades 912a-d, 914a-d, 916a-d, 918a-d of the first aircraft engine 106L is the same as a layout or orientation of the cascades 912a-d, 914a-d, 916a-d, 918a-d of the second aircraft engine 106R. As a result, interchangeability between respective ones of cascades 912a-d, 914a-d, 916a-d, 918a-d of the first thrust reverser assembly 802 and respective ones of cascades 912a-d, 914a-d, 916a-d, 918a-d of the second thrust reverser assembly 804 can be achieved without needing to flip, mirror, rotate or otherwise reorientating a first cascade 912a from the first cascade assembly 902a of the first aircraft engine 106L when positioning the first cascade 912a on the second aircraft engine 1106R. Additionally, such interchangeability maintaining a same orientation of the exhaust vector defined by a pattern of the first cascade 912a. Thus, the plurality of cascades 912a-d, 914a-d, 916a-d, 918a-d is not symmetric with respect to a vertical plane (e.g., the vertical plane 806 of FIG. 8) passing through a center axis of the fuselage 104. Thus, an advantage of providing symmetric thrust reverser systems disclosed herein enables use of only two different cascade assemblies 902 and 904 for each aircraft engine (i.e., as opposed to four cascade assemblies for a twin-engine aircraft 1200 of FIG. 12), thereby reducing maintenance and/or manufacturing complexities and/or costs. For instance, manufacturing is simplified by manufacturing two sets of thrust reverser assemblies 802 and 804 (e.g., four sub-assemblies 910a-d) for each twin-engine aircraft as opposed to the four sets of thrust reverser assemblies (e.g., eight sub-assemblies) used by the twin-engine aircraft 1200 of FIG. 12.

Figure 10:
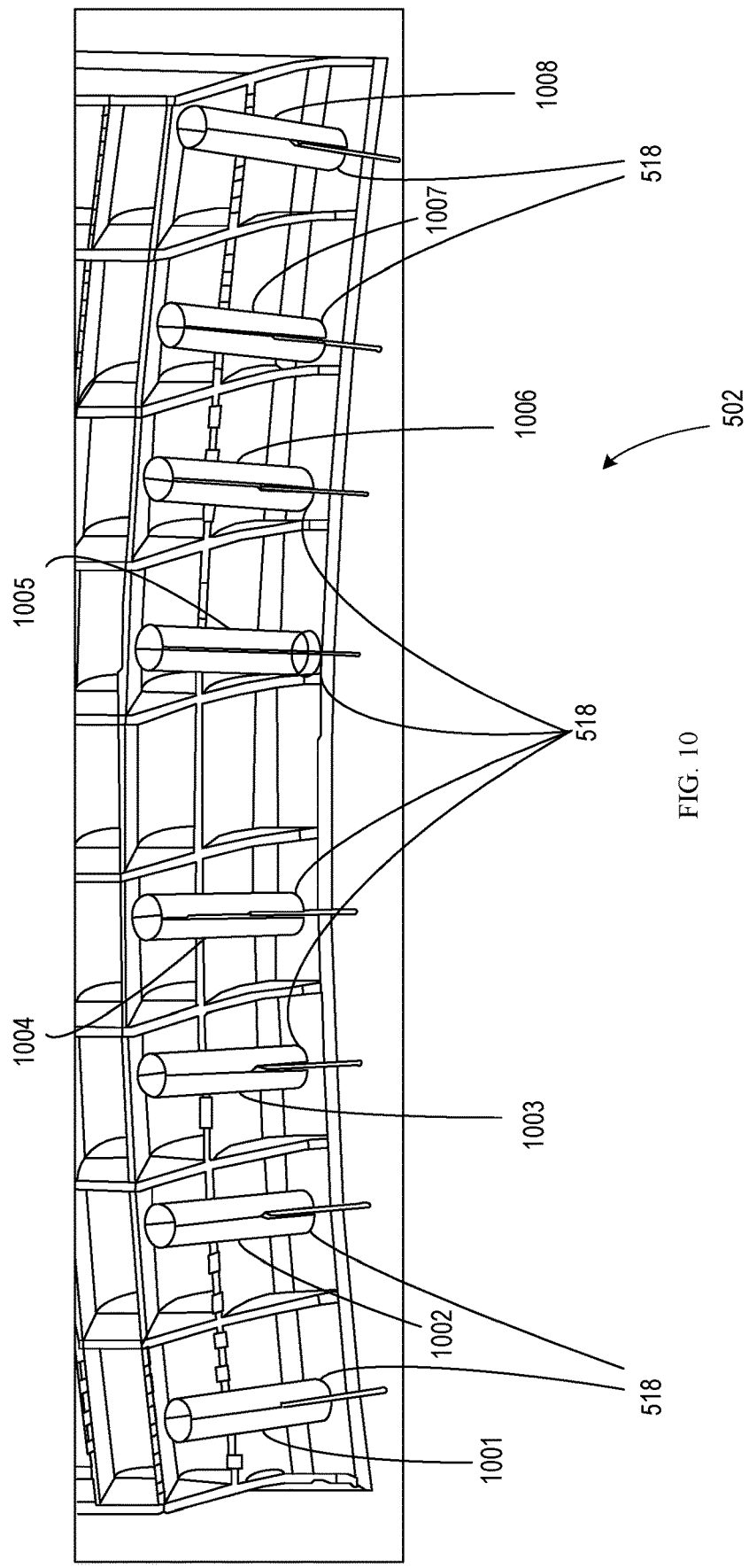
FIG. 10 is a partial perspective view of an example cascade disclosed herein.

FIG. 10 is a partial, perspective view of the example cascade 502 of FIG. 5. The cascade 502 of FIG. 5 can implement the cascades 912a-d, 914a-d, 916a-d and 918a-d of the example first cascade assembly 902 and the second cascade assembly 904 of FIG. 9. As noted above, the mounting holes 518 receive fasteners 1001-1008 to couple the cascade 502 and the aircraft engine 106. However, in some examples, the cascade 502 can include or omit any of the fasteners 1001-1008 (e.g., bolts). In some examples, each one of the cascades 912a-d, 914a-d, 916a-d and 918a-d can have a unique mounting (e.g., bolt) hole pattern to facilitate assembly of the cascades 912a-d, 914a-d, 916a-d, 918a-d with the aircraft engine 106. As used herein, a unique bolt pattern means that each one of the cascades 912a-d, 914a-d, 916a-d and 918a-d has pattern of mounting holes 518 that is different than a pattern of mounting holes 518 of another one of the cascades 912a-d, 914a-d, 916a-d and 918a-d. For example, the first cascade 912a can include mounting holes 518 with fasteners 1001 and 1007, the second cascade 912b can include mounting holes 518 with fasteners 1002 and 1006, the third cascade 912c can include mounting holes 518 with fasteners 1003 and 1005, and so on. The unique bolt pattern provides safety by preventing mis-installation. For example, the first cascade 912a of FIG. 9 cannot by installed into a position or location of a second cascade 912b of FIG. 9 because the mounting hole pattern of the first cascade 912a includes mounting holes 518 with fasteners 1001 and 1007 and would not align with mounting holes of the aircraft engine 106 associated with the second cascade 912b because the mounting holes of the aircraft engine 106 associated with the second cascade 912b has a pattern of mounting holes 518 with fasteners 1002 and 1006. Thus, the first cascade 912a cannot be installed in a location of the second cascade 912b.

Figure 11:
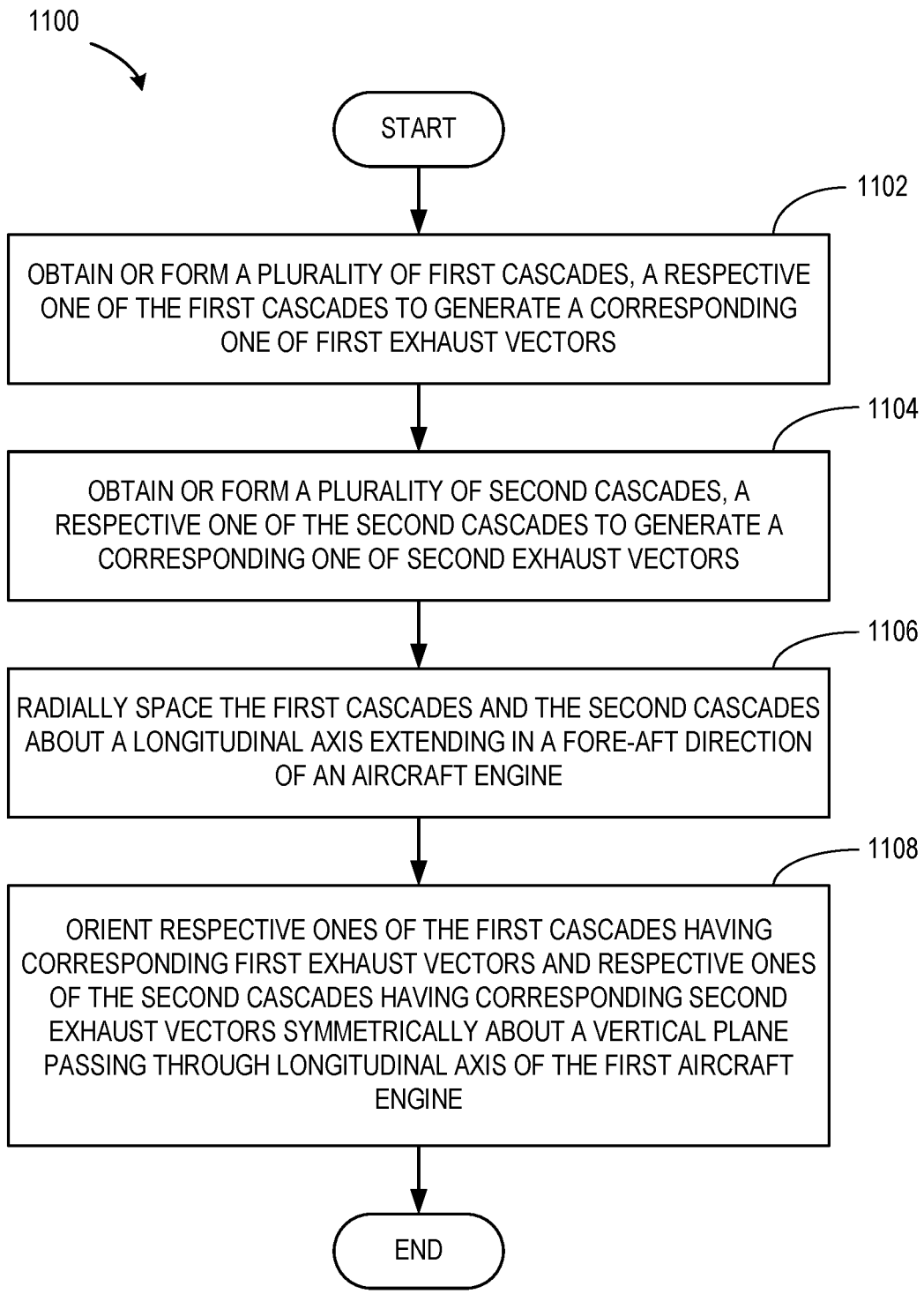
FIG. 11 is a flowchart representative of an example method of forming the example thrust reverser system disclosed herein.

FIG. 11 is a flowchart representative of an example method 1100 for forming the example cascade system 222 of the example thrust reverser system 110 disclosed herein. The method 1100 includes obtaining or forming a plurality of first cascades (e.g., the cascades 912a-d and/or 914a-d) (block 1102). For example, the cascades 912a-d and/or 914a-d can be formed with openings 504 to generate a corresponding one of first exhaust vectors (e.g., the exhaust vectors 913a-d, 915a-d). A plurality of second cascades (e.g., the cascades 916a-d, 918a-d) are obtained or formed (block 1104). For example, the second cascades (e.g., the cascades 916a-d, 918a-d) can be formed with openings 504 to generate a corresponding one of second exhaust vectors (e.g., the exhaust vectors 917a-d, 916a-d). The first and second cascades are circumferentially spaced about the aircraft engine 106 or radially spaced the about the longitudinal axis 224 the aircraft engine 106 (block 1106). The respective ones of the first cascades (e.g., the cascades 912a-d, 914a-d) having corresponding first exhaust vectors (e.g., the exhaust vectors 913a-d, 915a-d) and respective ones of the seconds cascades (e.g., the cascades 916a-d, 918a-d) having corresponding second exhaust vectors (e.g., the exhaust vectors 917a-d, 919a-d) are oriented symmetrically about the vertical plane 806 passing through the longitudinal axis 224 (block 1108).

Although the example method 1100 is described with reference to the flowchart illustrated in FIG. 11, many other methods of forming the example thrust reverser system 110 of FIGS. 1-10 may alternatively be used. For example, the order of execution of the blocks may be changed, and/or some of the blocks described may be changed, eliminated, or combined. Similarly, additional operations may be included in the manufacturing process before, in between, or after the blocks shown in FIG. 11.

Example methods, apparatus, systems, and articles of manufacture to implement symmetric cascade thrust reversers systems are disclosed herein. Further examples and combinations thereof include the following:

Example 1 includes an apparatus including a first cascade, and a second cascade, the first cascade and the second cascade to be radially spaced relative to a longitudinal axis of a first aircraft engine extending in a fore-aft direction, the first cascade to provide a first flow characteristic and the second cascade to provide a second flow characteristic, the first flow characteristic provided by the first cascade is symmetric relative to the second flow characteristic of the second cascade with respect to a vertical plane passing through the longitudinal axis of the aircraft engine.

Example 2 includes the apparatus of example 1, wherein the first cascade includes a first cascade sub-assembly and a second cascade sub-assembly, and wherein the second cascade includes a third cascade sub-assembly and a fourth cascade sub-assembly.

Example 3 includes the apparatus of any one of examples 1 or 2, wherein the first cascade sub-assembly provides a first exhaust vector, the second cascade sub-assembly provides a second exhaust vector, the third cascade sub-assembly provides a third exhaust vector, and fourth cascade provides a fourth exhaust vector, wherein first exhaust vector is symmetric relative to the third exhaust vector with respect to the vertical plane, and the second exhaust vector and the fourth exhaust vector are symmetric with respect to the vertical plane.

Example 4 includes the apparatus of any one of examples 1-3, wherein each of the cascade segments has a unique bolt pattern.

Example 5 includes the apparatus of any one of examples 1-4, wherein the plurality of cascades is not symmetric with respect to a longitudinal plane of a plane fuselage.

Example 6 is an apparatus including a first aircraft engine including a first thrust reverser system, the first thrust reverser system including a plurality of first cascades radially spaced relative to a first longitudinal axis of the first aircraft engine, a respective one of the first cascades configured to provide a corresponding one of first exhaust vectors when the first thrust reverser system is in a deployed position, wherein each one of the first cascades is in a unique radial position relative to the first longitudinal axis and a plurality of second cascades radially spaced relative to the first longitudinal axis of the first aircraft engine, a respective one of the second cascades configured to provide a corresponding one of second exhaust vectors when the first thrust reverser system is in the deployed position, wherein each one of the second cascades is in a unique radial position relative to the first longitudinal axis, and wherein respective ones of the first exhaust vectors are symmetric relative to the respective ones of the second exhaust vectors with reference to a first vertical plane passing through the first longitudinal axis of the first aircraft engine and extending in a fore-aft direction of the first aircraft engine.

Example 7 includes the apparatus of examples 6, wherein the apparatus of any preceding clause, including a second aircraft engine including a second thrust reverser system, the second thrust reverser system including a plurality of third cascades configured to provide a plurality of third exhaust vectors, the third cascades radially spaced relative to a second longitudinal axis of the second aircraft engine, a respective one of the third cascades configured to provide a corresponding one of third exhaust vectors when the second thrust reverser system is in a deployed position, wherein each one of the third cascades is in a unique radial position relative to the second longitudinal axis and a plurality of fourth cascades radially spaced relative to the second longitudinal axis of the second aircraft engine, a respective one of the fourth cascades configured to provide a respective one of fourth exhaust vectors when the second thrust reverser system is in the deployed position, wherein each one of the fourth cascades is in a unique radial position relative to the second longitudinal axis, and wherein the respective ones of the third exhaust vectors are symmetric relative to respective ones of the second exhaust vectors with reference to a second vertical plane passing through the second longitudinal axis of the second aircraft engine and extending in a fore-aft direction of the second aircraft engine.

Example 8 includes the apparatus of any one of the examples 6-7, wherein each of the exhaust vectors of the first aircraft engine and the second aircraft engine includes a forward turning angle and a side turning angle.

Example 9 includes the apparatus of any one of the examples 6-8, wherein a first one of the first cascades located in a first radial position relative to the first longitudinal axis of the first aircraft engine is interchangeable with a second one of the third cascades located in a first radial position relative to the second longitudinal axis of the second aircraft engine, wherein the first radial position relative to the first longitudinal axis of the first aircraft engine is at a same position as the first radial position relative to the second longitudinal axis of the second aircraft engine.

Example 10 includes the apparatus of any one of the examples 6-9, wherein a first exhaust vector of the first one of the first cascades and a second exhaust vector of the second one of the third cascades are equivalent.

Example 11 includes the apparatus of any one of the examples 6-10, wherein respective ones of the first cascades of the first aircraft engine are interchangeable with respective ones of the third cascades of the second aircraft engine, and respective ones of the second cascades of the first aircraft engine are interchangeable with respective ones of the fourth cascades of the second aircraft engine.

Example 12 includes the apparatus of any one of the examples 6-11, wherein the second cascades and the fourth cascades are positioned in a same orientation when the second cascades are coupled to the first aircraft engine and the fourth cascades are coupled to the second aircraft engine.

Example 13 includes the apparatus of any one of the examples 6-12, wherein the first cascades are positioned on a first side of the first vertical plane and the second cascades are positioned on a second side of the first vertical plane when the first cascades and the second cascades are coupled to the first aircraft engine.

Example 14 includes the apparatus of any one of the examples 6-13, wherein the third cascades are positioned on a first side of the second vertical plane and the fourth cascades are positioned on a second side of the second vertical plane when coupled to the second aircraft engine when the third cascades and the fourth cascades are coupled to the second aircraft engine.

Example 15 includes the apparatus of any one of the examples 6-14, wherein first side of the first vertical plane is oriented in the same orientation as the first side of the second vertical plane, and the second side of the first vertical plane is oriented in the same orientation as the second side of the second vertical plane.

Example 16 includes the apparatus of any one of the examples 6-15, wherein first side of the first vertical plane is oriented in the same orientation as the first side of the second vertical plane, and the second side of the first vertical plane is oriented in the same orientation as the second side of the second vertical plane.

Example 17 includes the apparatus of any one of the examples 6-16, wherein a forward turning angle and a side turning angle of the respective ones of the first exhaust vectors of the first thrust reverser system are identical to a forward turning angle and a side turning angle of the respective ones of the third exhaust vectors of the second thrust reverser system.

Example 18 includes the apparatus of any one of the examples 6-17, wherein a forward turning angle and a side turning angle of the respective ones of the second exhaust vectors of the first thrust reverser system are identical to a forward turning angle and a side turning angle of the respective ones of the fourth exhaust vectors of the second thrust reverser system.

Example 19 includes a method including, obtaining a plurality of first cascades, a respective one of the first cascades to generate a corresponding one of first exhaust vectors, obtaining a plurality of second cascades, a respective one of the second cascades to generate a corresponding one of second exhaust vectors, radially spacing the first cascades and the second cascades about a first center axis extending in a fore-aft direction of a first aircraft engine, and orientating respective ones of the first cascades and corresponding first exhaust vectors and respective ones of the second cascades and corresponding second exhaust vectors symmetrically about a first vertical plane passing through the first center line of the first aircraft engine.

Example 20 includes the method of example 19, including, obtaining a plurality of third cascades, a respective one of the third cascades to generate a corresponding one of third exhaust vectors, obtaining a plurality of fourth cascades, a respective one of the fourth cascades to generate a corresponding one of fourth exhaust vectors, radially spacing the third cascades and the fourth cascades about a second center axis of a second aircraft engine, orientating respective ones of the third cascades and corresponding third exhaust vectors and respective ones of the fourth cascades and corresponding fourth exhaust vectors symmetrically about a second vertical plane passing through the second center line in the fore-aft direction of the second aircraft engine.

Example 21 includes the method of any one of the examples 19-20, including forming varying bolt patterns for each of the first cascades.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a first cascade assembly including a plurality of first cascades spaced circumferentially along a first portion of an aircraft engine with respect to a first plane and a second plane passing through a longitudinal axis of the aircraft engine extending in a fore-aft direction, the first plane being orthogonal relative to the second plane, the first cascades positioned between a first side of the first plane and a first side of the second plane, respective ones of the first cascades providing corresponding respective ones of first exhaust vectors, wherein a first one of the first exhaust vectors adjacent the second plane is oriented toward the second plane, second ones of the first exhaust vectors oriented in a direction away from the second plane, the first exhaust vectors of the first cascades collectively providing a first flow characteristic of a thrust reverser;
a second cascade assembly including a plurality of second cascades spaced circumferentially along a second portion of the aircraft engine, the second cascades positioned between the first side of the first plane and a second side of the second plane opposite the first side of the second plane, respective ones of the second cascades providing corresponding respective ones of second exhaust vectors, the second exhaust vectors of the second cascades collectively providing a second flow characteristic of the thrust reverser;
a third cascade assembly including a plurality of third cascades spaced circumferentially along a third portion of the aircraft engine, the third cascades positioned between a second side of the first plane opposite the first side of the first plane and the first side of the second plane, respective ones of the third cascades providing corresponding respective ones of third exhaust vectors, wherein a first one of the third exhaust vectors adjacent the second plane is oriented toward the second plane, second ones of the third exhaust vectors being oriented away from the second plane, the third exhaust vectors of the third cascades collectively providing a third flow characteristic of the thrust reverser; and
a fourth cascade assembly including a plurality of fourth cascades spaced circumferentially along a fourth portion of the aircraft engine, the fourth cascades positioned between the second side of the first plane and the second side of the second plane, respective ones of the fourth cascades providing corresponding respective ones of fourth exhaust vectors, the fourth exhaust vectors of the fourth cascades collectively providing a fourth flow characteristic of the thrust reverser, the first and second flow characteristics to be respectively symmetric to the third and fourth flow characteristics relative the first plane, the first and third flow characteristics to be respectively asymmetric to the second and fourth flow characteristics relative the second plane.

2. The apparatus of claim 1, wherein each of the first cascade assembly, the second cascade assembly, the third cascade assembly, and the fourth cascade assembly has a unique mounting bolt pattern.

3. The apparatus of claim 1, wherein the aircraft engine is a first aircraft engine and the thrust reverser is a first thrust reverser, and further including:
a fifth cascade assembly including a plurality of fifth cascades spaced circumferentially along a first portion of a second aircraft engine with respect to a third plane and a fourth plane passing through a second longitudinal axis of the second aircraft engine extending in a fore-aft direction, the third plane being orthogonal relative to the fourth plane, the fifth cascades positioned between a first side of the third plane and a first side of the fourth plane, respective ones of the fifth cascades providing corresponding respective ones of fifth exhaust vectors, wherein a first one of the fifth exhaust vectors adjacent the fourth plane is oriented toward the fourth plane, second ones of the fifth exhaust vectors oriented in a direction away from the fourth plane, the fifth exhaust vectors of the fifth cascades collectively providing a fifth flow characteristic of a second thrust reverser;

a sixth cascade assembly including a plurality of sixth cascades spaced circumferentially along a second portion of the second aircraft engine, the sixth cascades positioned between the first side of the third plane and a second side of the fourth plane opposite the first side of the fourth plane, respective ones of the sixth cascades providing corresponding respective ones of sixth exhaust vectors, the sixth exhaust vectors of the sixth cascades collectively providing a sixth flow characteristic of the second thrust reverser;

a seventh cascade assembly including a plurality of seventh cascades spaced circumferentially along a third portion of the second aircraft engine, the seventh cascades positioned between a second side of the third plane opposite the first side of the third plane and the first side of the fourth plane, respective ones of the seventh cascades providing corresponding respective ones of seventh exhaust vectors, wherein a first one of the seventh exhaust vectors adjacent the fourth plane is oriented toward the fourth plane, second ones of the seventh exhaust vectors being oriented away from the fourth plane, the seventh exhaust vectors of the seventh cascades collectively providing a seventh flow characteristic of the second thrust reverser; and an eighth cascade assembly including a plurality of eight cascades spaced circumferentially along a fourth portion of the second aircraft engine, the eighth cascades positioned between the second side of the first-third plane and the second side of the fourth plane, respective ones of the eighth cascades providing corresponding respective ones of eighth exhaust vectors, the eighth exhaust vectors of the eighth cascades collectively providing an eighth flow characteristic of the second thrust reverser, the fifth and sixth flow characteristics to be respectively symmetric to the seventh and eighth flow characteristics relative the third plane, the fifth and seventh flow characteristics to be respectively asymmetric to the sixth and eighth flow characteristics relative the fourth plane.

4. The apparatus of claim 3, wherein the first cascade assembly of the first aircraft engine is interchangeable with the fifth cascade assembly of the second aircraft engine, the second cascade assembly of the first aircraft engine is interchangeable with the sixth cascade assembly of the second aircraft engine, the third cascade assembly of the first aircraft engine is interchangeable with the seventh cascade assembly of the second aircraft engine, and the fourth cascade assembly of the first aircraft engine is interchangeable with the eighth cascade assembly of the second aircraft engine.

5. The apparatus of claim 3, wherein the first cascade assembly and the fifth cascade assembly are positioned in the same orientation when the first cascade assembly is coupled to the first aircraft engine and the fifth cascade assembly is coupled to the second aircraft engine, the second cascade assembly and the sixth cascade assembly are positioned in the same orientation when the second cascade assembly is coupled to the first aircraft engine and the sixth cascade assembly is coupled to the second aircraft engine, the third cascade assembly and the seventh cascade assembly are positioned in the same orientation when the third cascade assembly is coupled to the first aircraft engine and the seventh cascade assembly is coupled to the second aircraft engine, and the fourth cascade assembly and the eighth cascade assembly are positioned in the same orientation when the first cascade assembly is coupled to the first aircraft engine and the eighth cascade assembly is coupled to the second aircraft engine.

6. An apparatus comprising:
a first aircraft engine including a first thrust reverser system, the first thrust reverser system including:
a plurality of first cascades spaced relative to a first longitudinal axis of the first aircraft engine, respective ones of the first cascades to provide corresponding ones of first exhaust vectors when the first thrust reverser system is in a deployed position, the first exhaust vectors provided relative to a first half of the first thrust reverser system relative to a first vertical plane passing through the first longitudinal axis of the first aircraft engine and extending in a fore-aft direction of the first aircraft engine, the first cascades including a first set of four cascades and a second set of four cascades, the first set of four cascades positioned in a first quadrant of the first aircraft engine defined by a first side of the first vertical plane and a first side of a first horizontal plane passing through the first longitudinal axis and orthogonal to the first vertical plane, a first one of the first exhaust vectors provided by a first one of the first set of the first cascades immediately adjacent the first horizontal plane is oriented toward the first horizontal plane, second ones of the first exhaust vectors provided by other ones of the first set of the first cascades oriented opposite relative to the first one of the first exhaust vectors, the second set of four cascades positioned in a second quadrant of the first aircraft engine defined by the first side of the first vertical plane and a second side of the first horizontal plane, the first exhaust vectors provided by the first set of four cascades of the first quadrant and the first exhaust vectors provided by the second set of four cascades of the second quadrant to be asymmetric relative to the first horizontal plane; and
a plurality of second cascades spaced relative to the first longitudinal axis of the first aircraft engine, respective ones of the second cascades to provide corresponding ones of second exhaust vectors when the first thrust reverser system is in the deployed position, the second exhaust vectors provided relative to a second half of the first thrust reverser system opposite the first half relative to the first vertical plane, the second cascades including a third set of four cascades and a fourth set of four cascades, the third set of four cascades positioned in a third quadrant of the first aircraft engine defined by a second side of the first vertical plane opposite the first side of the first vertical plane and the first side of the first horizontal plane, a first one of the second exhaust vectors provided by a first one of the third set of the second cascades immediately adjacent the first horizontal plane is oriented toward the first horizontal plane, second ones of the second exhaust vectors provided by other ones of the third set of the second cascades are oriented opposite relative to the first one of the second exhaust vectors, the fourth set of four cascades positioned in a fourth quadrant of the first aircraft engine defined by the second side of the first vertical plane and the second side of the first horizontal plane, the second exhaust vectors provided by the third set of four cascades and the second exhaust vectors provided by the fourth set of four cascades to be asymmetric relative to the first horizontal plane, respective ones of the first exhaust vectors to be symmetric relative to respective ones of the second exhaust vectors with reference to the first vertical plane.

7. The apparatus of claim 6, further including a second aircraft engine including a second thrust reverser system, the second thrust reverser system including:
a plurality of third cascades spaced relative to a second longitudinal axis of the second aircraft engine, respective ones of the third cascades to provide corresponding ones of third exhaust vectors when the second thrust reverser system is in a deployed position, the third exhaust vectors provided relative to a first half of the second thrust reverser system relative to a second vertical plane passing through the second longitudinal axis of the second aircraft engine and extending in a fore-aft direction of the second aircraft engine, the third cascades including a fifth set of four cascades and a sixth set of four cascades, the fifth set of four cascades positioned in a fifth quadrant of the second aircraft engine defined by a first side of the second vertical plane and a first side of a second horizontal plane passing through the second longitudinal axis and orthogonal to the second vertical plane, the sixth set of four cascades positioned in a sixth quadrant of the second aircraft engine defined by the first side of the second vertical plane and a second side of the second horizontal plane, the third exhaust vectors provided by the fifth set of four cascades and the third exhaust vectors provided by the sixth set of four cascades to be asymmetric relative to the second horizontal plane; and
a plurality of fourth cascades spaced relative to the second longitudinal axis of the second aircraft engine, respective ones of the fourth cascades to provide corresponding ones of fourth exhaust vectors when the second thrust reverser system is in the deployed position, the fourth exhaust vectors provided relative to a second half of the second thrust reverser system opposite the first half relative to the second vertical plane, the fourth cascades including a seventh set of four cascades and an eighth set of four cascades, the seventh set of four cascades positioned in a seventh quadrant defined by a second side of the second vertical plane and the first side of the second horizontal plane, the eighth set of four cascades positioned in an eighth quadrant defined by the second side of the second vertical plane and the second side of the second horizontal plane, the fourth exhaust vectors provided by the seventh set of four cascades in the seventh quadrant and the fourth exhaust vectors provided by the eighth set of four cascades in the eight quadrant to be asymmetric relative to the first horizontal plane, respective ones of the third exhaust vectors to be symmetric relative to respective ones of the fourth exhaust vectors with reference to the second vertical plane.

8. The apparatus of claim 7, wherein each exhaust vector of the first, second, third, and fourth exhaust vectors includes a forward turning angle and a side turning angle.

9. The apparatus of claim 7, wherein a first one of the first cascades located in a first position relative to the first longitudinal axis of the first aircraft engine is interchangeable with a second one of the third cascades located in a first position relative to the second longitudinal axis of the second aircraft engine, the first position relative to the first longitudinal axis of the first aircraft engine to be at a same position as the first position relative to the second longitudinal axis of the second aircraft engine.

10. The apparatus of claim 9, wherein respective ones of the first exhaust vectors and the corresponding ones of the third exhaust vectors are equivalent.

11. The apparatus of claim 7, wherein respective ones of the first cascades of the first aircraft engine are interchangeable with respective ones of the third cascades of the second aircraft engine, and respective ones of the second cascades of the first aircraft engine are interchangeable with respective ones of the fourth cascades of the second aircraft engine.

12. The apparatus of claim 7, wherein the first cascades and the third cascades are positioned in a same orientation when the first cascades are coupled to the first aircraft engine and the third cascades are coupled to the second aircraft engine.

13. The apparatus of claim 7, wherein the second cascades and the fourth cascades are positioned in a same orientation when the second cascades are coupled to the first aircraft engine and the fourth cascades are coupled to the second aircraft engine.

14. The apparatus of claim 7, wherein the first side of the first vertical plane is oriented in the same orientation as the first side of the second vertical plane, and the second side of the first vertical plane is oriented in the same orientation as the second side of the second vertical plane.

15. The apparatus of claim 7, wherein a forward turning angle and a side turning angle of the respective ones of the first exhaust vectors are identical to a forward turning angle and a side turning angle of the respective ones of the third exhaust vectors.

16. The apparatus of claim 7, wherein a forward turning angle and a side turning angle of the respective ones of the second exhaust vectors are identical to a forward turning angle and a side turning angle of the respective ones of the fourth exhaust vectors.

17. The apparatus of claim 7, wherein the first set of four cascades positioned in the first quadrant of the first aircraft engine is interchangeable with the fifth set of four cascades positioned in the fifth quadrant of the second aircraft engine.

18. The apparatus of claim 7, wherein the second set of four cascades positioned in the second quadrant of the first aircraft engine is interchangeable with the sixth set of four cascades positioned in the sixth quadrant of the second aircraft engine.

19. A method comprising:
orientating a plurality of first cascades about a first center axis of a first aircraft engine extending in a fore-aft direction of the first aircraft engine, respective ones of the first cascades to generate corresponding ones of first exhaust vectors, the first exhaust vectors collectively defining first flow characteristics of a first side of a first thrust reverser system relative to a first vertical plane passing through the first center axis of the first aircraft engine, the first exhaust vectors to be asymmetric relative to a first horizontal plane passing through the first center axis, the first horizontal plane being perpendicular to the first vertical plane, a first one of the first exhaust vectors of the first cascades immediately adjacent the first horizontal plane being directed toward the horizontal plane and other ones of the first exhaust vectors provided by other ones of the first cascades oriented in a direction away from the horizontal plane; and orientating a plurality of second cascades about the first center axis of the first aircraft engine, respective ones of the second cascades to generate corresponding ones of second exhaust vectors, the second exhaust vectors collectively defining second flow characteristics of a second side of the first thrust reverser system relative to the first vertical plane, the first side opposite the second side, the second exhaust vectors to be asymmetric relative to the first horizontal plane, a first one of the second cascades positioned immediately adjacent the first horizontal plane having an exhaust vector directed toward the first horizontal plane and other ones of the second exhaust vectors provided by other ones of the second cascades oriented in a direction away from the horizontal plane.

20. The method of claim 19, further comprising:

orientating a plurality of third cascades about a second center axis of a second aircraft engine extending in a fore-aft direction of the second aircraft engine, respective ones of the third cascades to generate corresponding ones of third exhaust vectors, the third exhaust vectors collectively defining third flow characteristics of a first side of a second thrust reverser system relative to a second vertical plane passing through the second center axis of the second aircraft engine, the third exhaust vectors to be asymmetric relative to a second horizontal plane passing through the second center axis, the second horizontal plane being perpendicular to the second vertical plane; and orientating a plurality of fourth cascades about the second center axis of the second aircraft engine, respective ones of the fourth cascades to generate corresponding ones of fourth exhaust vectors, the fourth exhaust vectors collectively defining fourth flow characteristics of a second side of the second thrust reverser system opposite the first side relative to the second vertical plane, the fourth exhaust vectors to be asymmetric relative to the second horizontal plane.

\* \* \* \* \*

UNITED STATES PATENT AND TRADEMARK OFFICE
CERTIFICATE OF CORRECTION

| | | |
|---|---|---|
| PATENT NO. | : 12,196,156 B2 | Page 1 of 1 |
| APPLICATION NO. | : 17/444116 | |
| DATED | : January 7, 2025 | |
| INVENTOR(S) | : Samson et al. | |

It is certified that error appears in the above-identified patent and that said Letters Patent is hereby corrected as shown below:

In the Claims

Column 19, Claim 3, Line 41, Delete "first-third" and insert --third--.

Signed and Sealed this
Second Day of September, 2025

Coke Morgan Stewart
*Acting Director of the United States Patent and Trademark Office*